United States Patent
Yao et al.

(10) Patent No.: US 12,362,869 B2
(45) Date of Patent: Jul. 15, 2025

(54) TECHNOLOGIES FOR CONSTRUCTING HYBRID AUTOMATIC REPEAT REQUEST—ACKNOWLEDGMENT CODEBOOK

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 17/697,506

(22) Filed: Mar. 17, 2022

(65) Prior Publication Data

US 2022/0321281 A1    Oct. 6, 2022

Related U.S. Application Data

(60) Provisional application No. 63/170,942, filed on Apr. 5, 2021.

(51) Int. Cl.
*H04W 4/06* (2009.01)
*H04L 1/1829* (2023.01)
*H04W 72/0446* (2023.01)

(52) U.S. Cl.
CPC ........... *H04L 1/1861* (2013.01); *H04W 4/06* (2013.01); *H04W 72/0446* (2013.01)

(58) Field of Classification Search
CPC ..... H04W 76/22; H04W 36/12; H04W 36/38; H04W 76/10; H04W 76/11; H04W 36/00; H04W 36/0011
See application file for complete search history.

(56) References Cited

U.S. PATENT DOCUMENTS 12,016,016 B2 * 6/2024 Yi .................... H04W 72/1268
2021/0168762 A1 * 6/2021 Huang ................ H04L 1/1864
(Continued)

FOREIGN PATENT DOCUMENTS

WO  WO-2022099181 A2 * 5/2022 ........... H04L 1/1851
WO  WO-2022155371 A1 * 7/2022 ............. H04W 4/06

OTHER PUBLICATIONS

3rd Generation Partnership Project; Technical Specification Group Radio Access Network; NR; Physical layer procedures for control (Release 16), 3GPP TS 38.213 V16.5.0, Mar. 2021, 183 pages.
(Continued)

*Primary Examiner* — Nathan S Taylor
(74) *Attorney, Agent, or Firm* — Kilpatrick Townsend & Stockton LLP

(57) ABSTRACT

Provided is a method for constructing a hybrid automatic repeat request—acknowledge character (HARQ-ACK) codebook, performed at a user equipment (UE), comprising: generating HARQ-ACK information for at least one unicast downlink channel and HARQ-ACK information for at least one group-common downlink channel; and constructing the HARQ-ACK codebook based on the HARQ-ACK information for the at least one unicast downlink channel and the HARQ-ACK information for the at least one group-common downlink channel, wherein each group-common downlink channel associates with a MBS service.

15 Claims, 17 Drawing Sheets

(56) References Cited

U.S. PATENT DOCUMENTS

| | | | | |
|---|---|---|---|---|
| 2021/0336728 A1* | 10/2021 | Selvanesan | ............ | H04W 92/18 |
| 2022/0116962 A1* | 4/2022 | Zhang | ................... | H04L 5/0044 |
| 2022/0225384 A1* | 7/2022 | Takeda | ................. | H04L 12/189 |
| 2022/0321281 A1* | 10/2022 | Yao | ......................... | H04W 4/70 |
| 2023/0047407 A1* | 2/2023 | Li | ........................ | H04B 7/0639 |
| 2023/0049911 A1* | 2/2023 | Hu | ...................... | H04L 12/1868 |
| 2023/0216614 A1* | 7/2023 | Wang | ................... | H04L 1/1822 |
| | | | | 370/329 |
| 2023/0239077 A1* | 7/2023 | Gerami | ............ | H04W 72/1273 |
| | | | | 370/329 |
| 2023/0354370 A1* | 11/2023 | Yang | ................ | H04W 72/1273 |
| 2024/0056776 A1* | 2/2024 | Elmali | ................. | H04L 1/1861 |
| 2024/0187142 A1* | 6/2024 | Lei | ........................ | H04L 1/1864 |

OTHER PUBLICATIONS

RAN1 Chairman's Notes, 3GPP TSG RAN WG1 Meeting #102-e, Sep. 4, 2020, 204 pages.

New Work Item on NR Multicast and Broadcast Services, Huawei, 3GPP TSG RAN Meeting #86, RP-193248, Dec. 9-12, 2019, 5 pages.

RAN1 Chairman's Notes, 3GPP TSG RAN WG1 Meeting #104-e, Jan. 25-Feb. 5, 2021, 55 pages.

Session notes for 8.1 (Further enhancements on MIMO for NR, Samsung, 3GPP TSG RAN WG1 Meeting #103-e, R1-200XXXX, Oct. 26-Nov. 13, 2020, 2020, 11 pages.

FL summary#3 on improving reliability for MBS for RRC_CONNECTED UEs, Huawei, 3GPP TSG RAN WG1 Meeting #104-e, R1-2101987, Jan. 25-Feb. 5, 2021, 69 pages.

\* cited by examiner

TECHNOLOGIES FOR CONSTRUCTING HYBRID AUTOMATIC REPEAT REQUEST—ACKNOWLEDGMENT CODEBOOK

CROSS-REFERENCE TO RELATED APPLICATION

This application claims priority to U.S. Provisional Patent Application No. 63/170,942, filed Apr. 5, 2021, the entire disclosure of which is herein incorporated by reference.

TECHNICAL FIELD

This application relates generally to wireless communication systems, and more specifically to constructing of the Hybrid Automatic Repeat Request-Acknowledgement (HARQ-ACK) codebook.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In 5G wireless RANs, RAN nodes can include a 5G Node, new radio (NR) node or g Node B (base station), which communicate with a wireless communication device, also known as user equipment (UE).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (base station), which communicate with a wireless communication device, also known as user equipment (UE). Although some examples may be described with reference to any of E-UTRAN Node B, an eNB, an RNC and/or a base station, such devices may be replaced with any type of base station.

Multicast-Broadcast Services (MBS) exist today that allow data from a single source entity to be transmitted to multiple endpoints. These services are expected to be used extensively over wireless networks, hence there is a need for a capability in the UE to efficiently support them.

In RAN #86 meeting, a new working item (WI) on NR support of MBS was approved in RP-193248, which specifies required changes to improve reliability of Broadcast/Multicast service, e.g. by uplink (UL) feedback.

In RAN1 #103e-meeting, the multiple cases for simultaneous reception of unicast downlink channel and group-common downlink channel in a slot based on UE capability for RRC_CONNECTED UEs are further specified.

Aspects of the present disclosure describe UL HARQ-ACK for simultaneous reception of unicast downlink channel and group-common downlink channel in a slot.

Figure 1:
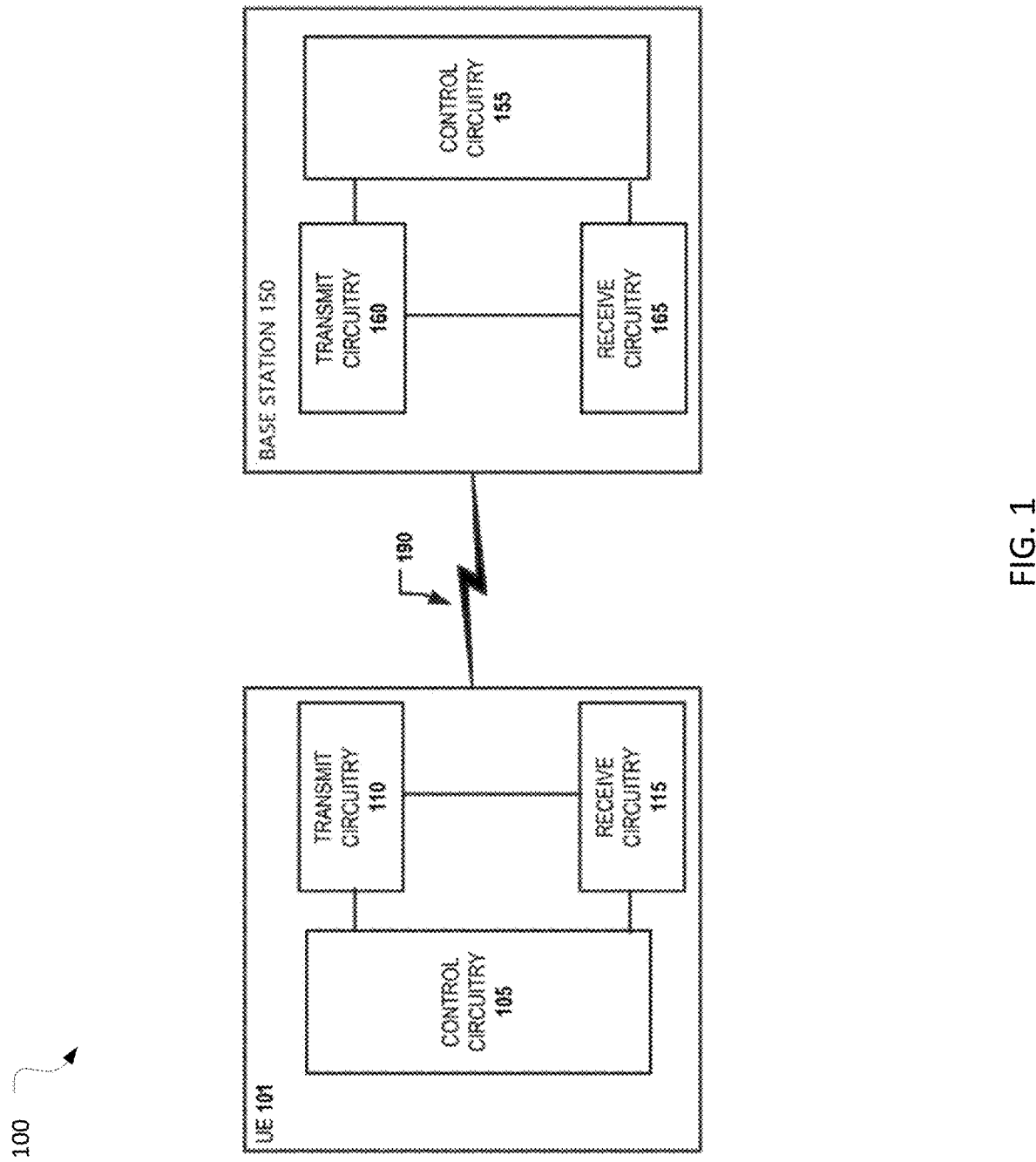
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into an amount of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, or video) structured within data blocks that are carried by the physical channels.

In some embodiments, the UE 101 may report a capability to support FDM reception in one or more of the following scenarios. In a first scenario, the UE 101 may only support TDM reception in a slot, no FDM between MBS PDSCH and unicast PDSCH may be supported. In a second scenario, the UE 101 may support FDM between multiple TDMed unicast PDSCHs and multiple TDMed group-common PDSCHs in a CFR. In a third scenario, the UE 101 may support FDM between multiple TDMed unicast PDSCHs and multiple TDMed group common PDSCHs in multiple CFRs.

Figure 2:
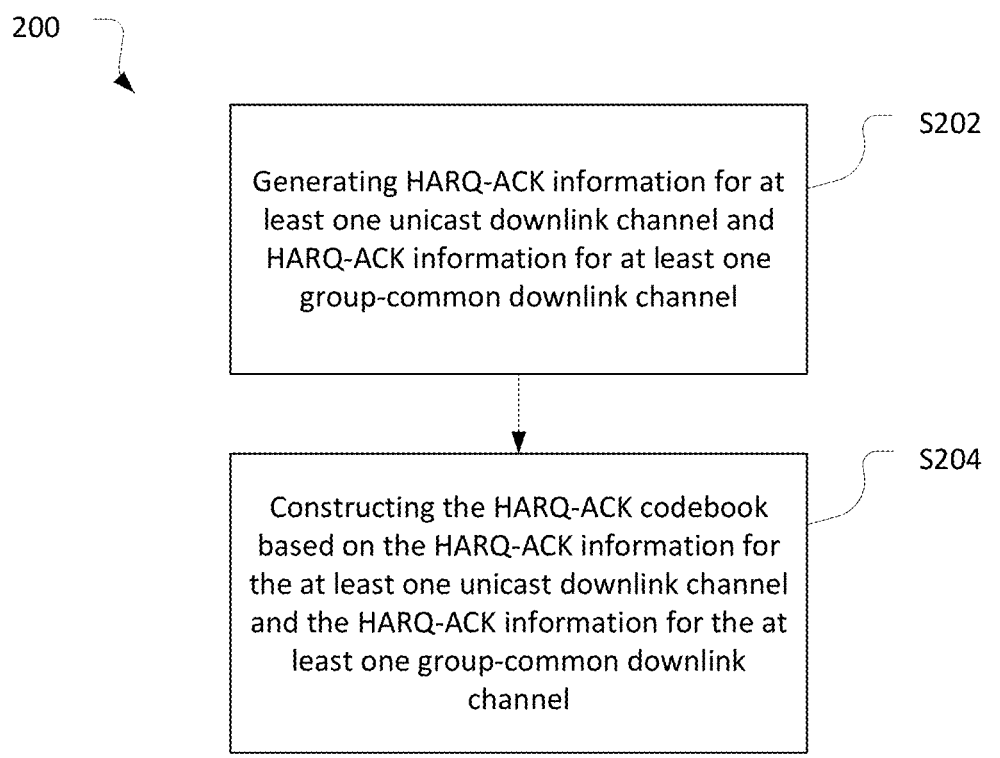
FIG. 2 illustrates a flowchart for an exemplary method for constructing a HARQ-ACK codebook in accordance with some embodiments.

FIG. 2 illustrates a flowchart for an exemplary method 200 for constructing a HARQ-ACK codebook in accordance with some embodiments. The method 200 illustrated in FIG. 2 may be implemented by the UE 101 described in FIG. 1.

The method 200 may begin at block S202 with the UE generating HARQ-ACK information for at least one unicast downlink channel and HARQ-ACK information for at least one group-common downlink channel.

In some embodiments, each group-common downlink channel associates with an MBS service.

In some embodiments, the UE generates HARQ-ACK information for at least one unicast downlink channel and HARQ-ACK information for at least one group-common downlink channel based on a time domain resource allocation (TDRA) table for the at least one unicast downlink channel and the at least one group-common downlink channel.

In other embodiments, the UE generates HARQ-ACK information for at least one unicast downlink channel and HARQ-ACK information for at least one group-common downlink channel based on downlink control information (DCI) for the at least one unicast downlink channel and the at least one group-common downlink channel. For example, the downlink assignment index (DAI) in the DCI may be used to generate the HARQ-ACK information.

In some embodiments, the DCI for the at least one unicast downlink channel and the at least one group-common downlink channel includes DCI for the at least one unicast downlink channel and DCI for the at least one group-common downlink channel. In other embodiments, DCI for the at least one unicast downlink channel and the at least one group-common downlink channel merely include DCI for the at least one unicast downlink channel.

In some embodiments, the unicast downlink channel may be a unicast Physical Downlink Shared Channel (PDSCH) or a Semi-Persistent Scheduling (SPS) release. In the case that the unicast downlink channel is a unicast PDSCH, the DCI for the unicast PDSCH may be the DCI of the Physical Downlink Control Channel (PDCCH) corresponding to the unicast PDSCH. In the case that the unicast downlink channel is an SPS release, the DCI for the unicast PDSCH may be the DCI of the PDCCH that activates the SPS or the DCI of the PDCCH that releases the SPS.

In some embodiments, the group-common downlink channel may be an MBS SPS PDSCH or a normal MBS PDSCH. In the case that the at least group-common downlink channel includes at least one MBS SPS PDSCH and at least one normal MBS PDSCH, the DCI for the at least group-common downlink channel may be the DCI for the at least one normal MB S PDSCH.

In some embodiments, the at least one unicast downlink channel and the at least one group-common downlink channel are TDMed. In some embodiments, the at least one group-common downlink channel includes multiple group-common downlink channels, and the multiple group-common downlink channels are TDM.

Although the situation of at least one unicast downlink channel and at least one group-common downlink channel is discussed in the present disclosure, it should be understood the method for constructing HARQ-ACK codebook discussed in the present application can also apply to the situation of at least one group-common channel. The difference between the situation of at least one unicast downlink channel and at least one group-common downlink channel and the situation of the at least one group-common channel is: in the situation of the at least one group-common downlink channel, only the HARQ-ACK information for the at least one group-common downlink channel may be generated and used to construct the HARQ-ACK codebook.

Figure 3:
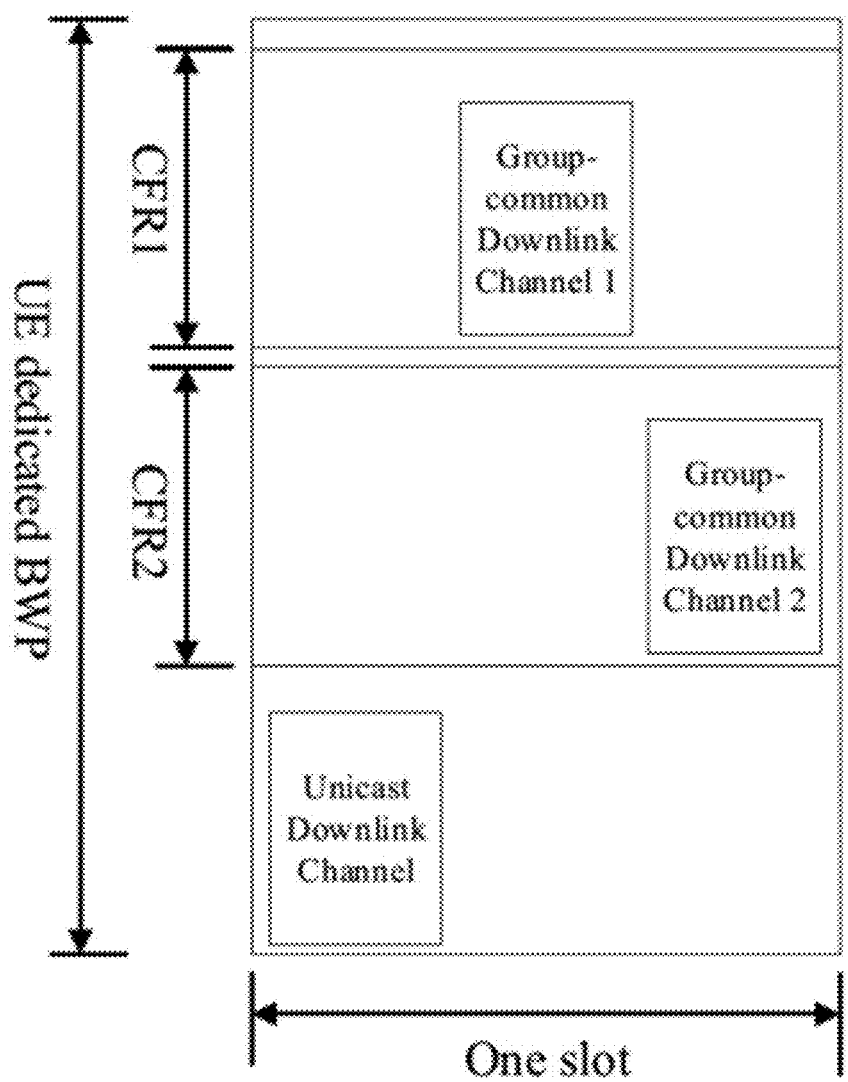
FIG. 3 illustrates an example that the at least one unicast downlink and the multiple group-common downlink channels are time division multiplexing (TDM) in accordance with some embodiments.

FIG. 3 illustrates an example in which at least one unicast downlink and multiple group-common downlink channels are time-multiplexed in accordance with some embodiments. FIG. 3 illustrates a UE-dedicated BWP that includes a plurality of CFRs, CFR1 and CFR2, to receive MBS services.

As shown in FIG. 3, in the dimension of time, the group-common downlink channel 1, the group-common downlink channel 2, and the unicast downlink channel are arranged in the same slot, which are TDMed; in the dimension of frequency, the group-common downlink channel 1, the group-common downlink channel 2, and the unicast downlink channel are arranged in the UE dedicated Bandwidth Part (BWP), wherein the group-common downlink channel 1 is arranged in CFR1, and the group-common downlink channel 2 is arranged in CFR2. In the example of FIG. 3, the unicast downlink channel does not overlap with CFR1 and CFR2 in frequency. However, it should be understood that the unicast downlink channel can overlap with CFR1 or CFR2 in the dimension of frequency, because the unicast downlink channel and the group-common channels 1-2 are TDMed.

In other embodiments, the at least one unicast downlink channel and the at least one group-common downlink are FDMed. In some embodiments, the at least unicast downlink channel includes multiple unicast downlink channels, which are TDMed. In some embodiments, the at least unicast downlink channel includes multiple group-common downlink channels in the same CFR, wherein the multiple group-common downlink channels in the same CFR are TDMed or FDMed.

Figure 4:
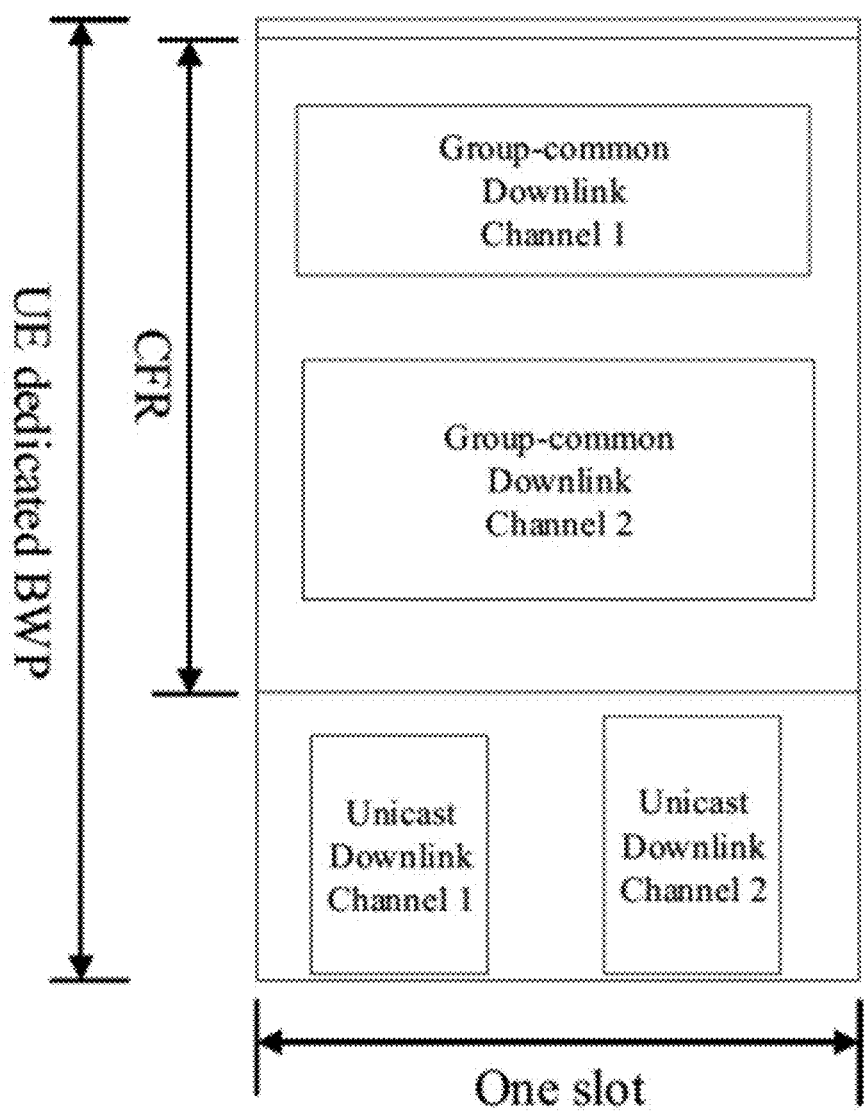
FIG. 4 illustrates the example that the multiple TDMed unicast downlink channels and the multiple group-common downlink channels are frequency-division multiplexed (FDMed), wherein the group-common downlink channels in the same common frequency resource (CFR) are FDMed in accordance with some embodiments.

FIG. 4 illustrates an example having multiple TDMed unicast downlink channels and multiple FDMed group-common downlink channels, wherein the group-common downlink channels in the same CFR are FDMed in accordance with some embodiments.

As shown in FIG. 4, the unicast downlink channels 1-2 and the group-common downlink channels 1-2 are arranged in the UE-dedicated BWP, wherein the FDMed group-common downlink channels 1-2 are arranged in a CFR, and the TDMed unicast downlink channels 1-2 are arranged in a frequency band other than the CFR in the UE-dedicated BWP.

Figure 5:
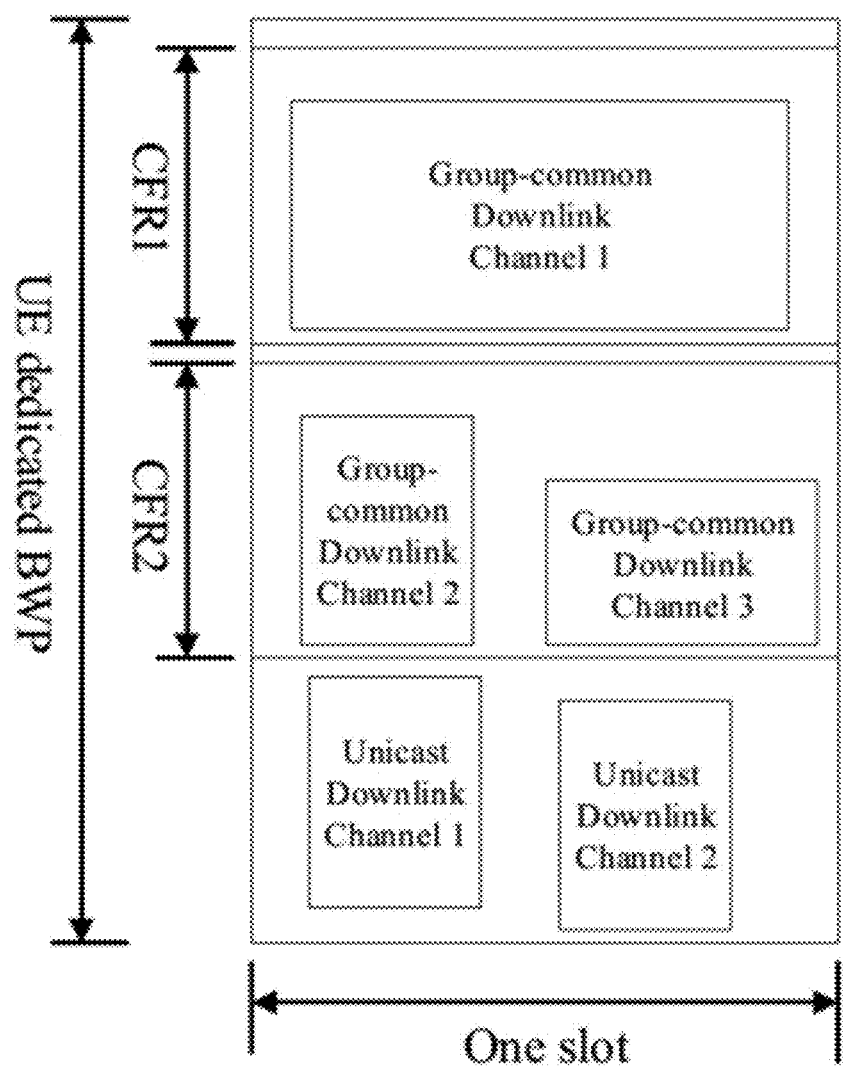
FIG. 5 illustrates the example that the multiple TDMed unicast downlink channels and the multiple group-common downlink channels are FDMed, wherein the group-common downlink channels in the same CFR are TDMed in accordance with some embodiments.

FIG. 5 illustrates an example having multiple TDMed unicast downlink channels and multiple FDMed group-common downlink channels, wherein the group-common downlink channels in the same CFR are TDMed in accordance with some embodiments.

As shown in FIG. 5, in the dimension of frequency, the unicast downlink channels 1-2 and the group-common channels 1-3 are arranged in the UE-dedicated BWP, wherein the group-common downlink channel 1 is arranged in CFR1, the TDMed group-common downlink channels 2-3 are arranged in CFR2, and the TDMed unicast downlink channels 1-2 are arranged in the frequency band other than CFR1 and CFR2 in the UE-dedicated BWP.

In some embodiments, the HARQ-ACK codebook of the UE may be configured to be a semi-static codebook or a dynamic codebook. The UE may use a Type-1 HARQ-ACK codebook determination for semi-static codebooks and a Type-2 HARQ-ACK codebook determination for a dynamic codebook. In the case that the HARQ-ACK codebook is configured to be a semi-static code, the UE generates HARQ-ACK information for at least one unicast downlink channel and HARQ-ACK information for at least one group-common downlink channel based on the time domain resource allocation (TDRA) table in the received DCI. In the case that the HARQ-ACK codebook may be configured to be a dynamic code, the UE generates HARQ-ACK information for at least one unicast downlink channel and HARQ-ACK information for at least one group-common downlink channel based on the set of DAI in the received DCI, wherein the set of DAI includes a Counter DAI (C-DAI) and a Total DAI (T-DAI).

Block S204 may include the UE constructing the HARQ-ACK codebook based on the HARQ-ACK information for the at least one unicast downlink channel and the HARQ-ACK information for the at least one group-common downlink channel.

In some embodiments, the HARQ-ACK codebook is constructed by concatenating the HARQ information for the at least one unicast downlink channel and the HARQ-ACK information for the at least one group-common downlink channel in a determined sequence.

In some embodiments, for each slot in a HARQ window, the HARQ-ACK information for the slot is placed in HARQ-ACK codebook according to the sequence of the slot in the HARQ window, wherein the HARQ-ACK information of the slot includes the HARQ-ACK information for the at least one unicast downlink channel and the HARQ-ACK information for the at least one group-common downlink channel corresponding to the slot. In other embodiments, the HARQ information for the at least one unicast downlink channel and the HARQ-ACK information for the at least one group-common downlink channel of the HARQ window are concatenated in sequence.

Figure 6:
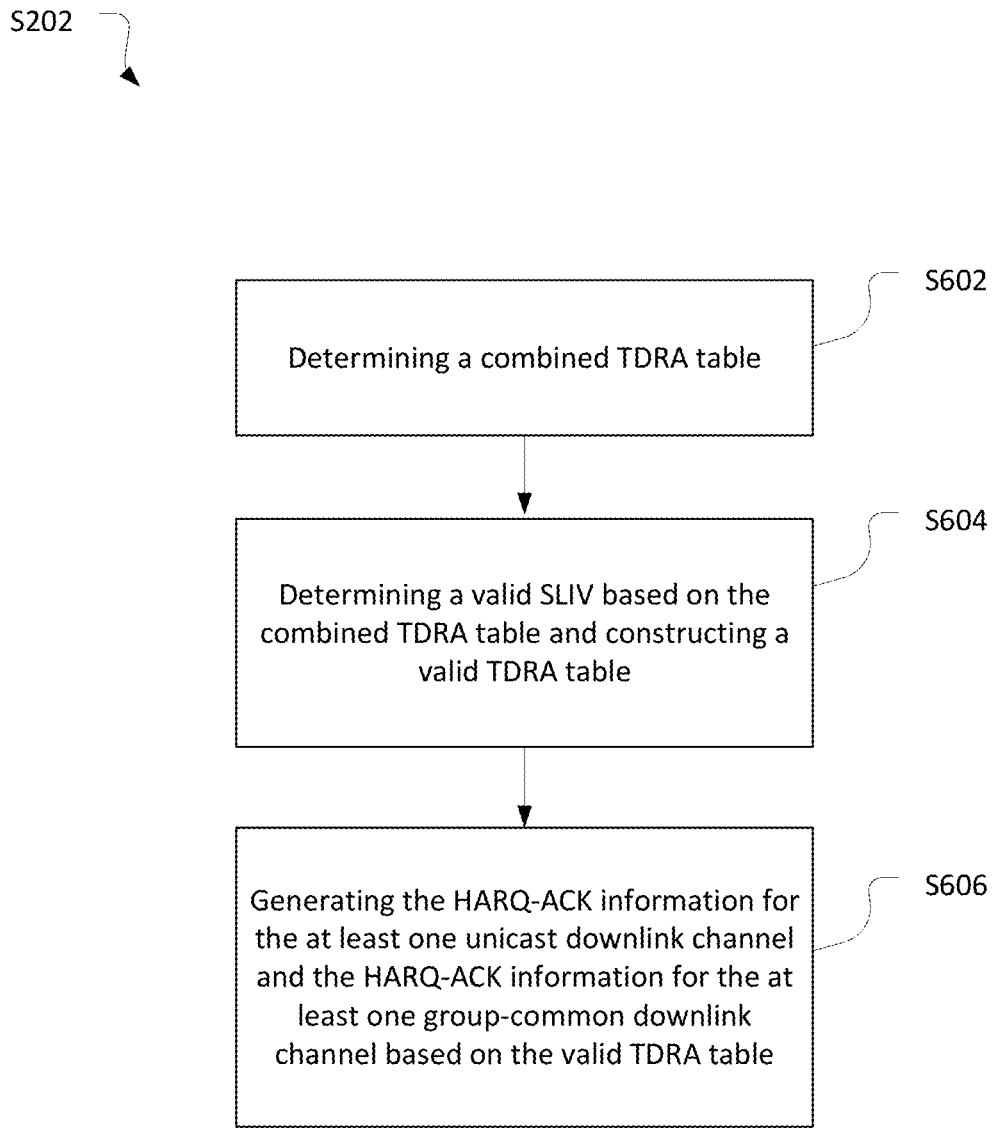
FIG. 6 illustrates a flowchart for an exemplary procedure of generating HARQ-ACK information for at least one unicast downlink channel and HARQ-ACK information for at least one group-common downlink channel in accordance with some embodiments.

FIG. 6 illustrates a flowchart for an exemplary procedure of generating HARQ-ACK information for at least one unicast downlink channel and HARQ-ACK information for at least one group-common downlink channel in accordance with some embodiments. The procedure illustrated in FIG. 6 may be performed for the example shown in FIG. 3.

Block S602 may include the UE determining a combined TDRA table based on a TDRA table corresponding to the at least one unicast downlink channel and at least one TDRA table corresponding to the at least one group-common downlink channel.

In some embodiments, for each group-common downlink channel, the at least one TDRA table corresponding to the at least one group-common downlink channel includes a TDRA table corresponding to the group-common downlink channel.

In some embodiments, for a group-common downlink channel configured with a TDRA table, the TDRA table corresponding to the group-common downlink channel is the TDRA table configured for the group-common downlink channel.

In some embodiments, for a group-common downlink channel that is not configured with a TDRA table, the TDRA table corresponding to the group-common downlink channel is a common TDRA table configured for the at least one group-common downlink channel, if the at least one group-common downlink channel is configured with the common TDRA table.

In some embodiments, for the group-common downlink channel that is not configured with a TDRA table, the TDRA table corresponding to the group-common downlink channel is a TDRA table in the pdsch-ConfigCommon, if the pdsch-ConfigCommon is configured for the UE and the at least one group-common downlink channel is not configured with the common TDRA table In some embodiments, for the group-common downlink channel that is not configured with a TDRA table, the TDRA table corresponding to the group-common downlink channel is a default TDRA table, if the pdsch-ConfigCommon is not configured for the UE. For example, the default TDRA table may be the Default PDSCH time domain resource allocation A for normal cyclic prefix (CP).

Table 1 shows the configuration for the TDRA table corresponding to the group-common downlink channel.

table and the pdsch-ConfigCommon is not configured for the UE, the at least one TDRA table corresponding to the at least one group-common downlink channel is the default TDRA table. For example, the default TDRA table may be the default PDSCH time domain resource allocation A for normal CP. In some embodiments, the UE determines a combined TDRA table by combining the entries of the TDRA table corresponding to the at least one unicast downlink channel and the entries of the TDRA table corresponding to the at least one group-common downlink channel, so that the combined TDRA table includes all entries of the TDRA table corresponding to the at least one unicast downlink channel and the entries of the TDRA table corresponding to the at least one group-common downlink channel.

Block S604 may include the UE determining a valid start and length indicator value (SLIV) based on the combined TDRA table and constructing a valid TDRA table based on the valid SLIV.

In some embodiments, the valid SLIV corresponds to the situations in which the at least one unicast downlink channel and the at least one group-common downlink channel are not-overlapping in the dimension of time.

In some embodiments, the UE constructs the valid TDRA tables by selecting the valid entries of the at least one unicast downlink channel and the at least one group-common downlink channel from the combined TDRA table, which may correspond to situations in which the at least one unicast

TABLE 1

| | | | Configuration for the TDRA table Corresponding to the Group-common Downlink Channel | | | |
|---|---|---|---|---|---|---|
| RNTI | PDCCH search space | SS/PBCH block and CORESET multiplexing pattern | pdsch-ConfigCommon includes pdsch-TimeDomainAllocation List | pdsch-Config-MBS includes pdsch-TimeDomainAllocation List | pdsch-ConfigCommon-MBS includes pdsch-TimeDomainAllocation List | PDSCH time domain resource allocation to apply |
| G-RNTI (RNTI defined for MBS) | Any common search space | 1, 2, 3 | No | No | No | Default |
| | | 1, 2, 3 | Yes | No | No | pdsch-TimeDomainAllocation List provided in pdsch-ConfigCommon |
| | UE specific search space | 1, 2, 3 | No/Yes | Yes | No | pdsch-TimeDomainAllocation List provided in pdsch-ConfigCommon-MBS |
| | | 1, 2, 3 | No/Yes | No/Yes | Yes | pdsch-TimeDomainAllocation List provided in pdsch-ConfigCommon-MBS |

In some embodiments, the at least one TDRA table corresponding to the at least one group-common downlink channel is a common TDRA table corresponding to the at least group-common downlink channel.

In some embodiments, if the at least one group-common downlink channel is configured with a common TDRA table, the at least one TDRA table corresponding to the at least one group-common downlink channel is the common TDRA table configured for the at least one group-common downlink channel.

In some embodiments, if the at least one group-common downlink channel is not configured with a common TDRA table and the pdsch-ConfigCommon is configured for the UE, the at least one TDRA table corresponding to the at least one group-common downlink channel is the TDRA table in the pdsch-ConfigCommon.

In some embodiments, if the at least one group-common downlink channel is not configured with a common TDRA downlink channel and the at least one group-common downlink channel are not-overlapping in the dimension of time.

Block S606 may include the UE generating the HARQ-ACK information for the at least one unicast downlink channel and the HARQ-ACK information for the at least one group-common downlink channel based on the valid TDRA table.

In some embodiments, each entry of the valid TDRA table corresponds to one HARQ-ACK bit. In this way, the bits of HARQ-ACK information for each slot may be calculated, and all bits for all slots in the HARQ window may be added to generate the HARQ-ACK codebook.

In some embodiments, the constructing the HARQ-ACK codebook based on the HARQ-ACK information for the at least one unicast downlink channel and the HARQ-ACK information for the at least one group-common downlink channel may include: concatenating the HARQ-ACK information for the at least one unicast downlink channel and the HARQ-ACK information for the at least one group-common downlink channel according to reception timing of the at least one unicast downlink channel and the at least one group-common downlink channel in a same slot.

For example, in the example shown in FIG. 3, the unicast downlink channel, the group-common downlink channel 1, and the group-common downlink channel 2 are received in sequence. Thus, the HARQ-ACK information for the unicast downlink channel, the HARQ-ACK information for group-common downlink channel 1, and the HARQ-ACK information for group-common downlink channel 2 may be concatenated in sequence to form the HARQ-ACK codebook.

Figure 7:
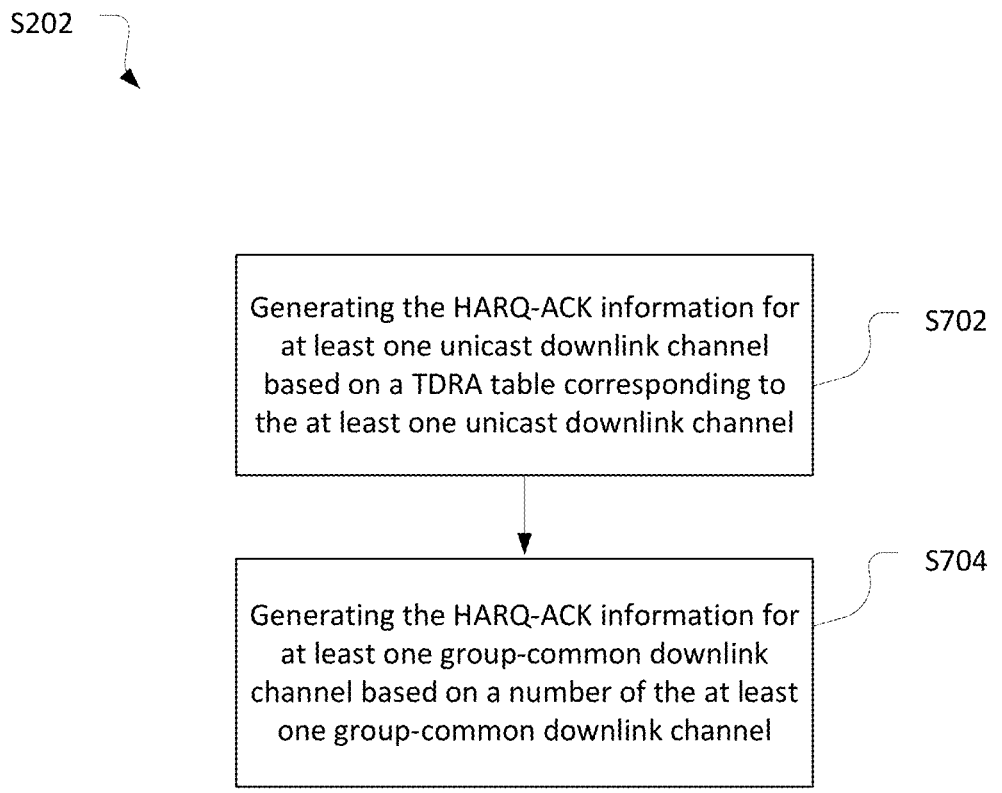
FIG. 7 illustrates a flowchart for an exemplary procedure of generating HARQ-ACK information for at least one unicast downlink channel and HARQ-ACK information for at least one group-common downlink channel in accordance with some embodiments.

FIG. 7 illustrates a flowchart for an exemplary procedure of generating HARQ-ACK information for at least one unicast downlink channel and HARQ-ACK information for at least one group-common downlink channel in accordance with some embodiments. The procedure illustrated in FIG. 7 may be performed for the example shown in FIG. 4.

Block S702 may include the UE generating the HARQ-ACK information for at least one unicast downlink channel based on a TDRA table corresponding to the at least one unicast downlink channel.

In some embodiments, when the at least one unicast downlink channel includes multiple TDMed unicast downlink channels, the TDRA table corresponding to multiple unicast downlink channels is applied to determine the valid SLIV for the multiple unicast downlink channels, and the number of bits to feedback in the slot is determined by a number of non-overlapped SLIVs.

In some embodiments, the unicast downlink channel is a unicast PDSCH or a SPS release. In some embodiments, a TDRA table corresponding to the SPS release is a TDRA table corresponding to an activation DCI or a released DCI.

Block S704 may include the UE generating HARQ-ACK information for at least one group-common downlink channel based on a number of the at least one group-common downlink channel.

In some embodiments, for each CFR of the at least one group-common downlink channel, the number of bits to feedback for the CFR may be determined by the number of MBS services configured for the CFR, e.g., the number of group-common downlink channels in the CFR. For example, in the example shown in FIG. 4, two group-common downlink channels are configured in the CFR and, therefore, two HARQ-ACK bits in a slot will be sent for the CFR.

In some embodiments, constructing the HARQ-ACK codebook based on the HARQ-ACK information for the at least one unicast downlink channel and the HARQ-ACK information for the at least one group-common downlink channel may include: concatenating HARQ-ACK information for slots in a HARQ window according to a sequence of the slots in the HARQ window, wherein, for each slot in the HARQ window, the HARQ-ACK information for the at least one unicast downlink channel and the HARQ-ACK information for the at least one group-common downlink channel of the slot are placed in the HARQ-ACK information for the slot in sequence. In some embodiments, for each slot in the HARQ window, for each group-common downlink channel, the HARQ-ACK information for the group-common downlink channel of the slot is placed in the HARQ-ACK information for the at least one group-common downlink channel of the slot according to a physical resource block (PRB) index of the group-common downlink channel.

For example, in the example shown in FIG. 4, if the HARQ window includes slots 0-2, and the PRB index of the group-common downlink channel 1 is higher than the PRB index of the group-common downlink channel 2, the HARQ-ACK codebook includes the HARQ-ACK information for slot 0, the HARQ-ACK information for slot 1, and the HARQ-ACK information for slot 2 in sequence, and the HARQ-ACK information for each slot includes the HARQ-ACK information for the unicast downlink channels 1-2, the HARQ-ACK information for the group-common downlink channel 1 and the HARQ-ACK information for the group-common downlink channel 2 of the slot in sequence.

In other embodiments, constructing the HARQ-ACK codebook based on the HARQ-ACK information for the at least one unicast downlink channel and the HARQ-ACK information for the at least one group-common downlink channel may include: concatenating HARQ-ACK information for the at least one unicast downlink channel and HARQ-ACK information for the at least one group-common downlink channel of a HRAQ window in sequence, wherein, for each group-common downlink channel, HARQ-ACK information for the group-common downlink channel of the HARQ window is placed in the HARQ-ACK information for the at least one group-common downlink channel of the HARQ window according to an PRB index of the group-common downlink channel. In some embodiments, for each slot in the HARQ window, the HARQ-ACK information for the at least one unicast downlink channel of the slot is placed in the HARQ-ACK information for the at least one unicast downlink channel of the HARQ window according to a sequence of the slot in the HARQ window, and for each group-common downlink channel, the HARQ-ACK information for the group-common downlink channel of the slot is placed in the HARQ-ACK information for the group-common downlink channel of the HARQ window according to the sequence of the slot in the HARQ window.

For example, in the example shown in FIG. 4, if the HARQ window includes slots 0-2, and the PRB index of the group-common downlink channel 1 is higher than the PRB index of the group-common downlink channel 2, the HARQ-ACK information includes the HARQ-ACK information for the unicast downlink channels 1-2, the HARQ-ACK information for the group-common downlink channel 1 and the HARQ-ACK information for the group-common downlink channel 2 of the HARQ window in sequence. In the HARQ-ACK information for the unicast downlink channels 1-2 of the HARQ window, the HARQ-ACK information for the unicast downlink channels 1-2 of the slot 0, the slot 1 and the slot 2 are placed in sequence; in the HARQ-ACK information for the group-common downlink channel 1 of the HARQ window, the HARQ-ACK information for the group-common downlink channel 1 of the slot 0, the slot 1 and the slot 2 are placed in sequence; in the HARQ-ACK information for the group-common downlink channel 2 of the HARQ window, the HARQ-ACK information for the group-common downlink channel 2 of the slot 0, the slot 1 and the slot 2 are placed in sequence.

Figure 8:
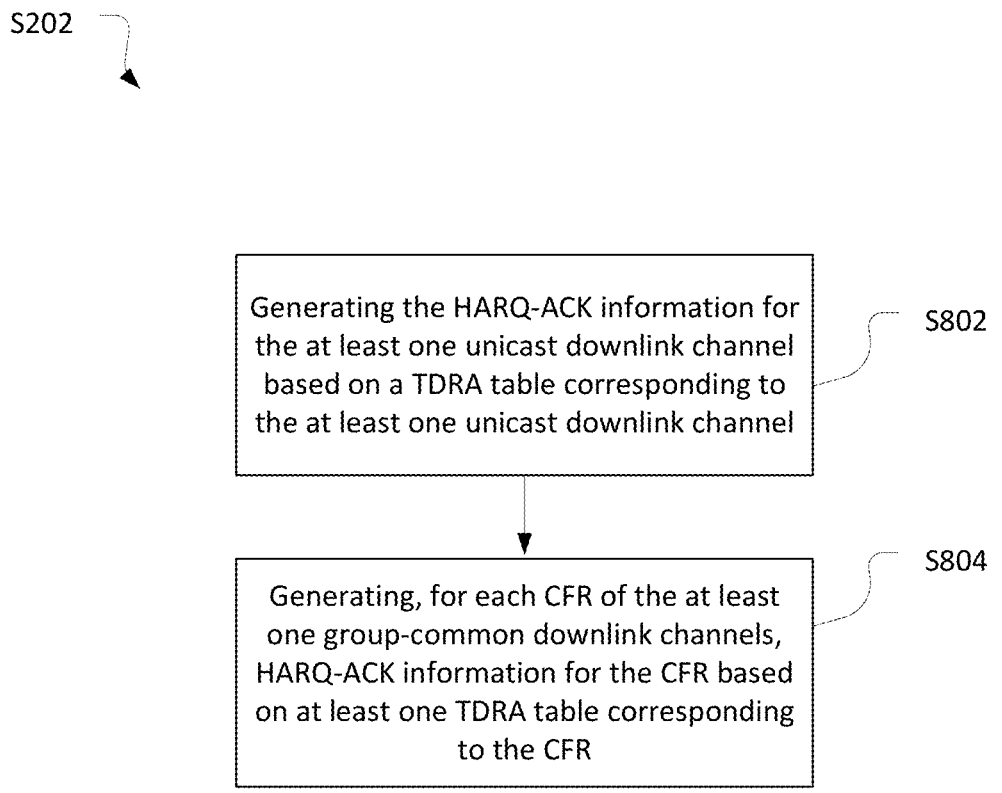
FIG. 8 illustrates a flowchart for an exemplary procedure of generating HARQ-ACK information for at least one unicast downlink channel and HARQ-ACK information for at least one group-common downlink channel in accordance with some embodiments.

FIG. 8 illustrates a flowchart for an exemplary procedure of generating HARQ-ACK information for at least one unicast downlink channel and HARQ-ACK information for at least one group-common downlink channel. The procedure illustrated in FIG. 8 may be performed for the example shown in FIG. 5.

Block S802 may include the UE generating the HARQ-ACK information for the at least one unicast downlink channel based on a TDRA table corresponding to the at least one unicast downlink channel.

In some embodiments, when the at least one unicast downlink channel includes multiple TDMed unicast downlink channels, the TDRA table corresponding to multiple unicast downlink channels is applied to determine the valid SLIV for the multiple unicast downlink channels, and the number of bits to feedback in the slot is determined by the number of non-overlapped SLIV.

In some embodiments, the unicast downlink channel is a unicast PDSCH or an SPS release. In some embodiments, a TDRA table corresponding to the SPS release is a TDRA table corresponding to an activation DCI or a released DCI.

Block S804 may include the UE generating, for each CFR of the at least one group-common downlink channel, HARQ-ACK information for the CFR based on at least one TDRA table corresponding to the CFR.

In some embodiments, for each one group-common downlink channel in each CFR, the at least one TDRA table corresponding to the CFR may include a TDRA table corresponding to the group-common downlink channel. The TDRA table corresponding to the group-common downlink channel can be configured as Table 1.

In other embodiments, the TDRA table corresponding to the CFR is the common TDRA table configured for all group-common downlink channels. In this situation, the common TDRA table configured for all group-common downlink channels is used in generating the HARQ-ACK information for the CFR.

In some embodiments, when a CFR includes multiple TDMed group-common downlink channels, the TDRA tables corresponding to multiple group-common downlink channels are applied to determine the valid SLIV for the multiple unicast downlink channels, and the number of bits to feedback in the slot is determined by the number of non-overlapped SLIV.

In some embodiments, constructing the HARQ-ACK codebook based on the HARQ-ACK information for the at least one unicast downlink channel and the HARQ-ACK information for the at least one group-common downlink channel may include: concatenating HARQ-ACK information for slots in a HARQ window according to a sequence of the slots in a HARQ window, wherein, for each slot in the HARQ window, the HARQ-ACK information for the slot includes the HARQ-ACK information for the at least one unicast downlink channel and the HARQ-ACK information for the at least one group-common downlink channel of the slot in sequence. In some embodiments, for each slot in the HARQ window, for each CFR of the at least one group-common downlink channel, the HARQ-ACK information for the CFR of the slot is placed in the HARQ-ACK information for the at least one group-common downlink channel of the slot according to an index of the CFR.

For example, in the example shown in FIG. 5, if the HARQ window includes slots 0-2, and the index of CFR 1 is higher than the index of CFR 2, the HARQ-ACK codebook includes the HARQ-ACK information for slot 0, the HARQ-ACK information for slot 1 and the HARQ-ACK information for slot 2 in sequence, and the HARQ-ACK information for each slot includes the HARQ-ACK information for the unicast downlink channels 1-2, the HARQ-ACK information for CFR 1 and the HARQ-ACK information for CFR 2 of the slot in sequence.

In other embodiments, constructing the HARQ-ACK codebook based on the HARQ-ACK information for the at least one unicast downlink channel and the HARQ-ACK information for the at least one group-common downlink channel may include: concatenating HARQ-ACK information for the at least one unicast downlink channel and the HARQ-ACK information for the at least one group-common downlink channel of a HRAQ window in sequence, wherein, for each CFR of the at least one group-common downlink channel of the HARQ window, HARQ-ACK information for the CFR of the HARQ window is placed in the HARQ-ACK information for the at least one group-common downlink channel of the HARQ window according to an index of the CFR. In some embodiments, for each slot in the HARQ window, the HARQ-ACK information for the at least one unicast downlink channel of the slot is placed in the HARQ-ACK information for the at least one unicast downlink channel of the HARQ window according to a sequence of the slot in the HARQ window, and for each CFR, the HARQ-ACK information for the CFR of the slot are placed in the HARQ-ACK information for the CFR of the HARQ window according to the sequence of the slot in the HARQ window.

For example, in the example shown in FIG. 5, if the HARQ window includes slots 0-2, and the index of CFR 1 is higher than the index of CFR 2, the HARQ-ACK information includes the HARQ-ACK information for the unicast downlink channels 1-2, the HARQ-ACK information for CFR 1 and the HARQ-ACK information for CFR 2 of the HARQ window in sequence. In the HARQ-ACK information for the unicast downlink channels 1-2 of the HARQ window, the HARQ-ACK information for the unicast downlink channels 1-2 of the slot 0, the slot 1 and the slot 2 are placed in sequence; in the HARQ-ACK information for CFR 1 of the HARQ window, the HARQ-ACK information for CFR 1 of the slot 0, the slot 1 and the slot 2 are placed in sequence; in the HARQ-ACK information for CFR 2 of the HARQ window, the HARQ-ACK information for CFR 2 of the slot 0, the slot 1 and the slot 2 are placed in sequence.

Figure 9:
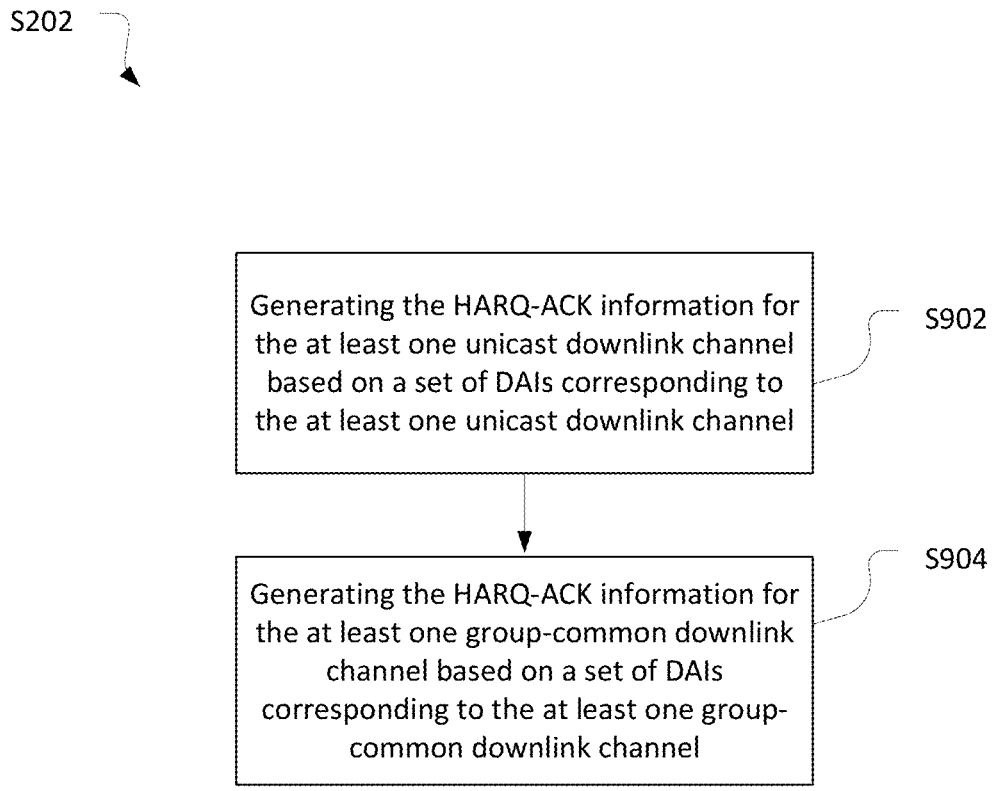
FIG. 9 illustrates a flowchart for an exemplary procedure of generating HARQ-ACK information for at least one unicast downlink channel and HARQ-ACK information for at least one group-common downlink channel in accordance with some embodiments.

FIG. 9 illustrates a flowchart for an exemplary procedure of generating HARQ-ACK information for at least one unicast downlink channel and HARQ-ACK information for at least one group-common downlink channel. The procedure illustrated in FIG. 9 may be performed for the examples shown in FIG. 3 and FIG. 4.

Block S902 may include the UE generating the HARQ-ACK information for the at least one unicast downlink channel based on a set of DAIs corresponding to the at least one unicast downlink channel. In some embodiments, the set of DAIs corresponding to the at least one unicast downlink channel includes the C-DAI and the T-DAI corresponding to the at least one unicast downlink channel.

Block S904 may include the UE generating the HARQ-ACK information for the at least one group-common downlink channel based on a set of DAIs corresponding to the at least one group-common downlink channel. In some embodiments, the set of DAIs corresponding to the at least one group-common downlink channel includes the C-DAI and the T-DAI corresponding to the at least one group-common downlink channel.

In some embodiments, if the at least one group-common downlink channel corresponds to multiple CFRs, each CFR of the at least one group-common downlink channel is treated as a cell when determining the DAI value. In other examples, for multiple FDMed group-common downlink channels in the same CFR, each of the multiple FDMed group-common downlink channels is treated as a cell when determining the DAI value.

In some embodiments, the UE may generate first HARQ-ACK bits for unicast transmissions in a plurality of cells over a plurality of slots and may also generate second HARQ-ACK bits for multicast transmissions in the plurality of cells over the plurality of slots. The UE may then generate the HARQ-ACK codebook by concatenating the first and second HARQ-ACK bits, with the first HARQ-ACK bits preceding the second HARQ-ACK bits.

In some embodiments, the constructing the HARQ-ACK codebook based on the HARQ-ACK information for the at least one unicast downlink channel and the HARQ-ACK information for the at least one group-common downlink channel may include: concatenating the HARQ-ACK information for the at least one unicast downlink channel and the HARQ-ACK information for the at least one group-common downlink channel in sequence.

In some embodiments, the HARQ-ACK information for the at least one unicast downlink channel is concatenated according to the C-DAI and the T-DAI corresponding to the at least one unicast downlink channel, and the HARQ-ACK information for the at least one group-common downlink channel is concatenated according to the C-DAI and the T-DAI corresponding to the at least one group-common downlink channel.

Figure 10:
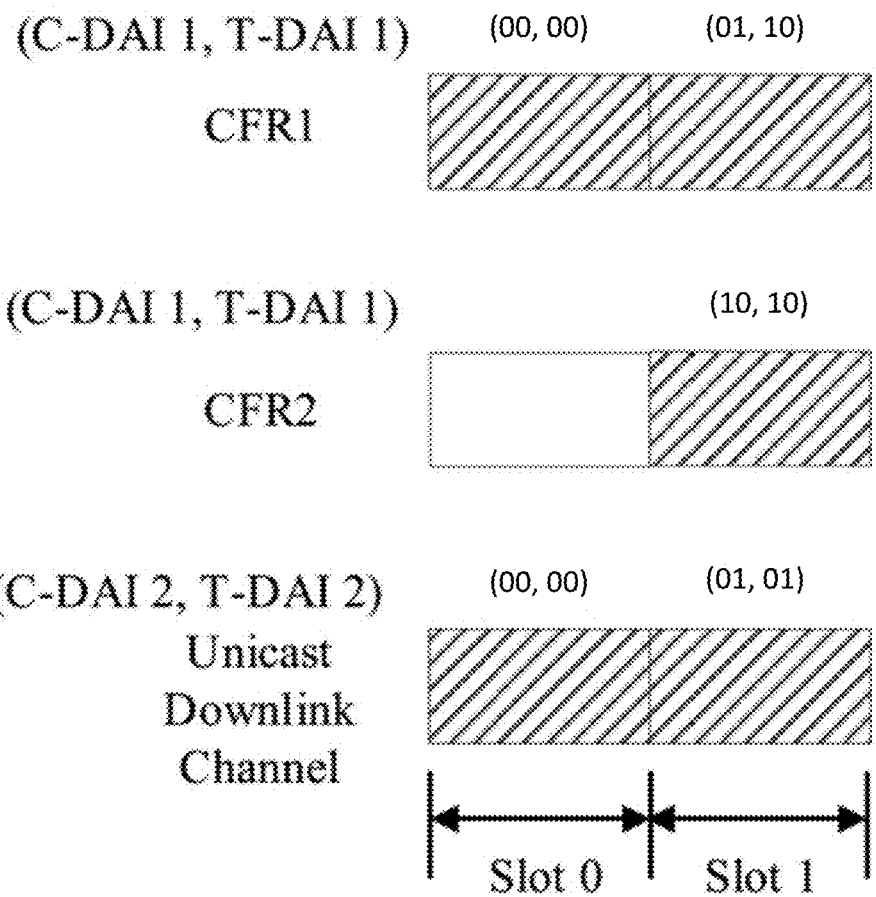
FIG. 10 illustrates an example of generating HARQ-ACK information for at least one unicast downlink channel and HARQ-ACK information for at least one group-common downlink channel based on separate sets of DCI in accordance with some embodiments.

FIG. 10 illustrates an example of generating HARQ-ACK information for at least one unicast downlink channel and HARQ-ACK information for at least one group-common downlink channel based on separate sets of DCI. In this example, separated DAI may be applied to unicast and multicast PDSCH transmissions. For example, the C-DAI and T-DAI values may be applied separately for unicast PDSCH and multicast PDSCH transmissions.

In FIG. 10, the box filled by the slashes indicates that the group-common downlink channel corresponding to the CFR or unicast downlink channel is scheduled during the slot, and the empty box indicates that the group-common downlink channel corresponding to the CFR or unicast downlink channel is not scheduled during the slot.

In slot 0, only the group-common downlink channel corresponding to CFR1 and the unicast downlink channel are scheduled, while the group-common downlink channel corresponding to CFR2 is not scheduled. Accordingly, in slot 0, the value of (C-DAI 1, T-DAI 1) for CFR 1 is (00, 00), and the value of (C-DAI 2, T-DAI 2) for the unicast downlink channel is also (00,00).

In slot 1, the group-common downlink channel corresponding to CFR1, the group-common downlink channel corresponding to CFR2, and the unicast downlink channel are all scheduled. Accordingly, in slot 1, the value of (C-DAI 1, T-DAI 1) for CFR 1 is (01, 10), the value of (C-DAI 1, T-DAI 1) for CFR 2 is (10,10), and the value of (C-DAI 2, T-DAI 2) for the unicast downlink channel is (01, 01).

As this embodiment counts the DAIS separately for unicast and multicast PDSCH transmissions, the T-DAI 1 of CFR1 for slot 0 is based on the number of transmissions of CFR1 and CFR2 in slot 0; the T-DAI 2 of the unicast downlink channel for slot 0 is based on the number of transmissions of the unicast downlink channel in slot 0; the T-DAI 2 of the unicast downlink channel for slot 1 is based on number of transmissions of the unicast downlink channel in slot 0 and slot 1; the multicast C-DAIs are sequentially incremented based on multicast transmissions in CFR1 in slot 0, CFR 1 in slot 1, and CFR2 in slot 1; and the unicast C-DAIs are sequentially incremented based on unicast transmissions in unicast downlink channel in slot 0 and unicast downlink channel in slot 1.

If a plurality of CFRs are configured, one CFR may be treated as one cell for purposes of determining the DAI value.

The UE may generate the HARQ-ACK codebook in the order of HARQ-ACK bit for the unicast PDSCH first, then followed by the HARQ-ACK bit for the MBS PDSCH.

Figure 11:
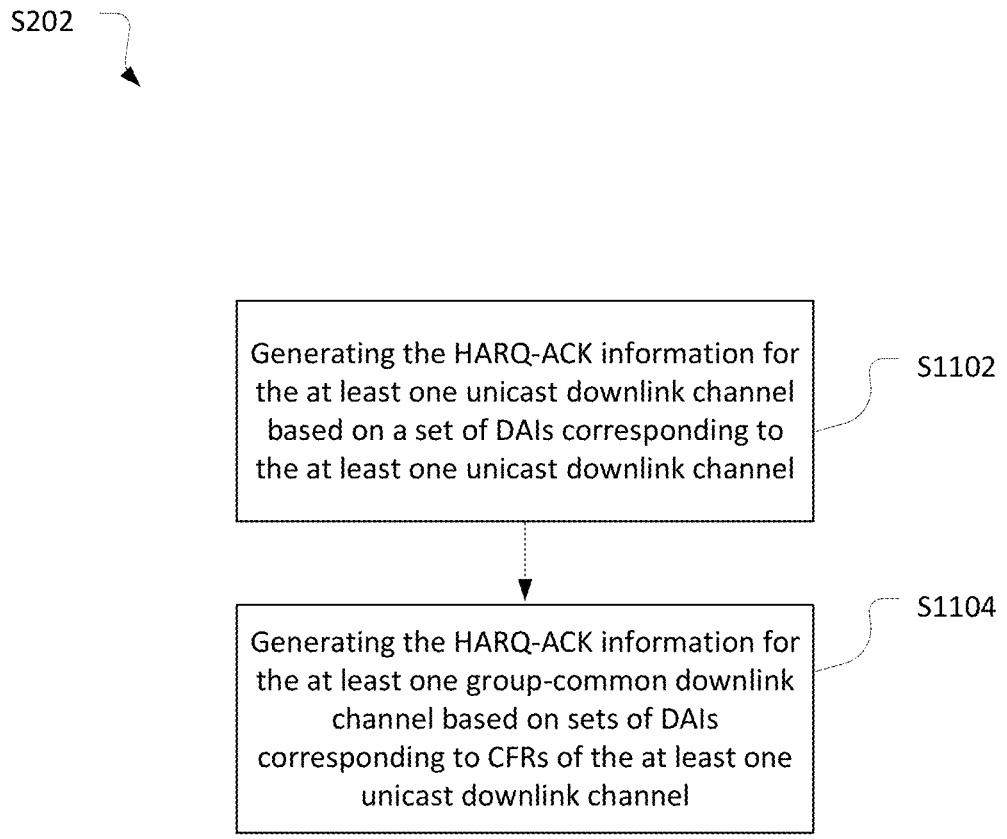
FIG. 11 illustrates a flowchart for an exemplary procedure of generating HARQ-ACK information for at least one unicast downlink channel and HARQ-ACK information for at least one group-common downlink channel in accordance with some embodiments.

FIG. 11 illustrates a flowchart for an exemplary procedure of generating HARQ-ACK information for at least one unicast downlink channel and HARQ-ACK information for at least one group-common downlink channel. The procedure illustrated in FIG. 11 may be performed for the example shown in FIG. 5.

Block S1102 may include the UE generating the HARQ-ACK information for the at least one unicast downlink channel based on a set of DAIs corresponding to the at least one unicast downlink channel. In some embodiments, the set of DAIs corresponding to the at least one unicast downlink channel includes the C-DAI and the T-DAI corresponding to the at least one unicast downlink channel.

Block S1104 may include the UE generating HARQ-ACK information for the at least one group-common downlink channel based on sets of DAIs corresponding to CFRs of the at least one unicast downlink channel. In some embodiments, the UE generates, for each CFR of the at least group-common downlink channel, HARQ-ACK information for the CFR based on a set of DAIs corresponding to the CFR.

In some embodiments, the set of DAIs corresponding to the CFR includes the C-DAI and the T-DAI corresponding to the CFR.

In some embodiments, if the at least one group-common downlink channel corresponds to multiple CFRs, each CFR of the at least one group-common downlink channel has its own set of DAI.

In some embodiments, constructing the HARQ-ACK codebook based on the HARQ-ACK information for the at least one unicast downlink channel and the HARQ-ACK information for the at least one group-common downlink channel may include: concatenating the HARQ-ACK information for the at least one unicast downlink channel and the HARQ-ACK information for the at least one group-common downlink channel in sequence.

In some embodiments, for each CFR of the at least group-common downlink channel, the HARQ-ACK information for the CFR is placed in the HARQ-ACK information for the at least one group-common downlink channel according to an index of the CFR.

In some embodiments, the HARQ-ACK information for the at least one unicast downlink channel is concatenated according to the C-DAI and the T-DAI corresponding to the at least one unicast downlink channel, and, for each CFR of the at least group-common downlink channel, the HARQ-ACK information for the CFR is concatenated according to the C-DAI and the T-DAI corresponding to the CFR.

Figure 12:
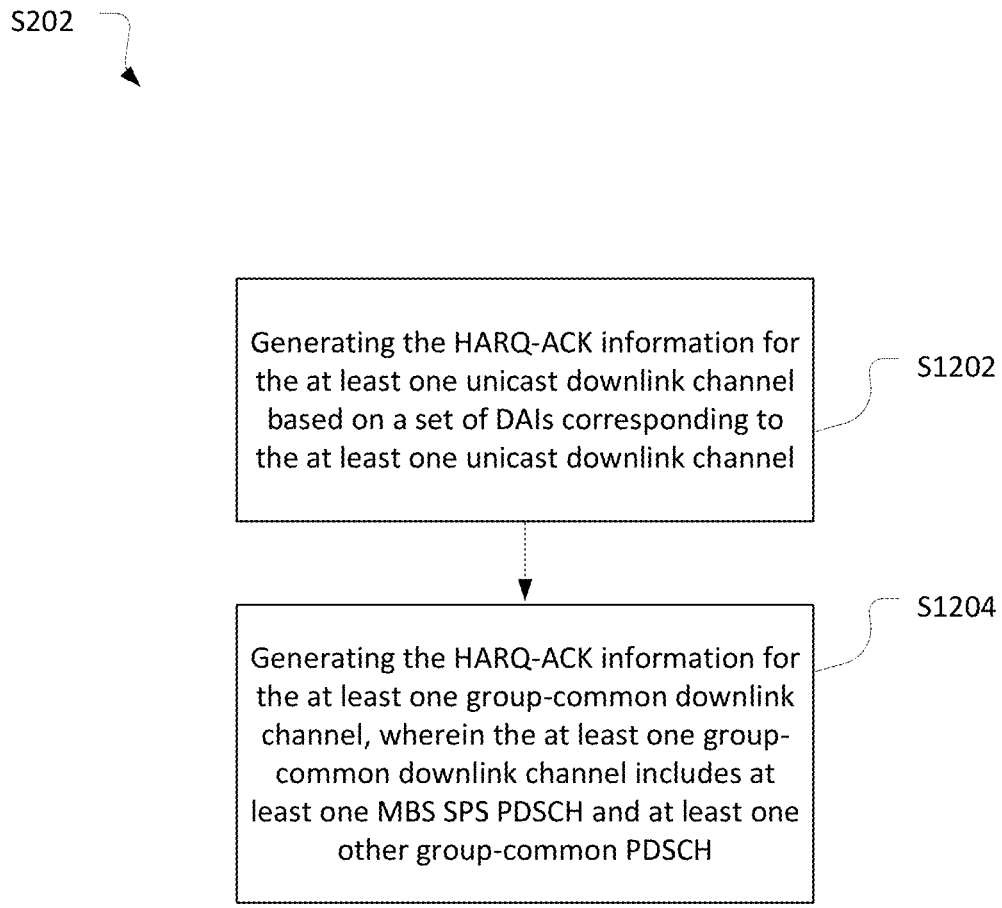
FIG. 12 illustrates a flowchart for an exemplary procedure of generating HARQ-ACK information for at least one unicast downlink channel and HARQ-ACK information for at least one group-common downlink channel in accordance with some embodiments.

FIG. 12 illustrates a flowchart for an exemplary procedure of generating HARQ-ACK information for at least one unicast downlink channel and HARQ-ACK information for at least one group-common downlink channel. The procedure illustrated in FIG. 12 may be performed for the example shown in FIG. 4.

Block S1202 may include the UE generating the HARQ-ACK information for the at least one unicast downlink channel based on a set of DAIS corresponding to the at least one unicast downlink channel. In some embodiments, the set of DAIS corresponding to the at least one unicast downlink channel includes the C-DAI and the T-DAI corresponding to the at least one unicast downlink channel.

Block S1204 may include the UE generating the HARQ-ACK information for the at least one group-common downlink channel, wherein the at least one group-common downlink channel includes at least one MBS SPS PDSCH and at least one other group-common PDSCH.

In some embodiments, the UE generates the HARQ-ACK information for the at least one MBS SPS PDSCH based on a number of the at least one group-common MBS SPS PDSCH, and generates the HARQ-ACK information for the at least one other group-common PDSCH based on a set of DAIs for the at least one other group-common PDSCH.

In some embodiments, the set of DAIs corresponding to the at least one other group-common PDSCH includes the C-DAI and the T-DAI corresponding to at least one other group-common PDSCH.

In some embodiments, constructing the HARQ-ACK codebook based on the HARQ-ACK information for the at least one unicast downlink channel and the HARQ-ACK information for the at least one group-common downlink channel may include: concatenating the HARQ-ACK information for the at least one unicast downlink channel, the HARQ-ACK information for the at least one MBS SPS PDSCH, and the HARQ-ACK information for the at least one other group-common PDSCH in sequence; or concatenating the HARQ-ACK information for the at least one MBS SPS PDSCH, the HARQ-ACK information for the at least one unicast downlink channel and the HARQ-ACK information for the at least one other group-common PDSCH in sequence; or concatenating the HARQ-ACK information for the at least one unicast downlink channel, the HARQ-ACK information for the at least one other group-common PDSCH and the HARQ-ACK information for the at least one MBS SPS PDSCH in sequence.

In some embodiments, the HARQ-ACK information for the at least one unicast downlink channel is concatenated according to the C-DAI and the T-DAI corresponding to the at least one unicast downlink channel, and the HARQ-ACK information for the at least one other group-common PDSCH is concatenated according to the C-DAI and the T-DAI corresponding to the at least one other group-common PDSCH.

Figure 13:
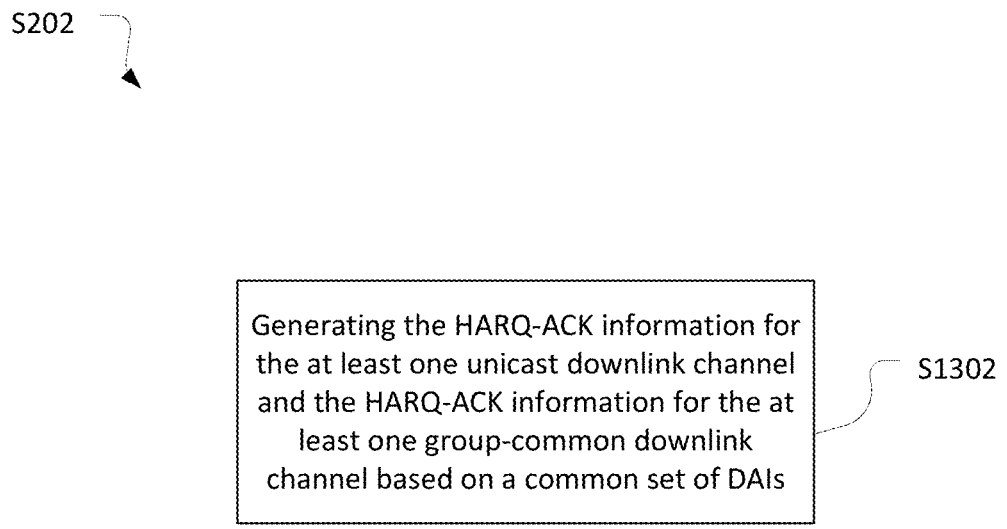
FIG. 13 illustrates a flowchart for an exemplary procedure of generating HARQ-ACK information for at least one unicast downlink channel and HARQ-ACK information for at least one group-common downlink channel in accordance with some embodiments.

FIG. 13 illustrates a flowchart for an exemplary procedure of generating HARQ-ACK information for at least one unicast downlink channel and HARQ-ACK information for at least one group-common downlink channel. The procedure illustrated in FIG. 13 may be performed for the example shown in FIG. 3.

Block S1302 may include the UE generating the HARQ-ACK information for the at least one unicast downlink channel and the HARQ-ACK information for the at least one group-common downlink channel based on a common set of DAIs. In some embodiments, the common set of DAIs include a C-DAI and a T-DAI.

In some embodiments, if the at least one group-common downlink channel corresponds to multiple CFRs, each CFR of the at least one group-common downlink channel is treated as a cell when determining the DAI value.

In some embodiments, constructing the HARQ-ACK codebook based on the HARQ-ACK information for the at least one unicast downlink channel and the HARQ-ACK information for the at least one group-common downlink channel may include: concatenating the HARQ-ACK information for the at least one unicast downlink channel and the HARQ-ACK information for the at least one group-common downlink channel according to the C-DAI and T-DAI of the common set of DAIs.

Figure 14:
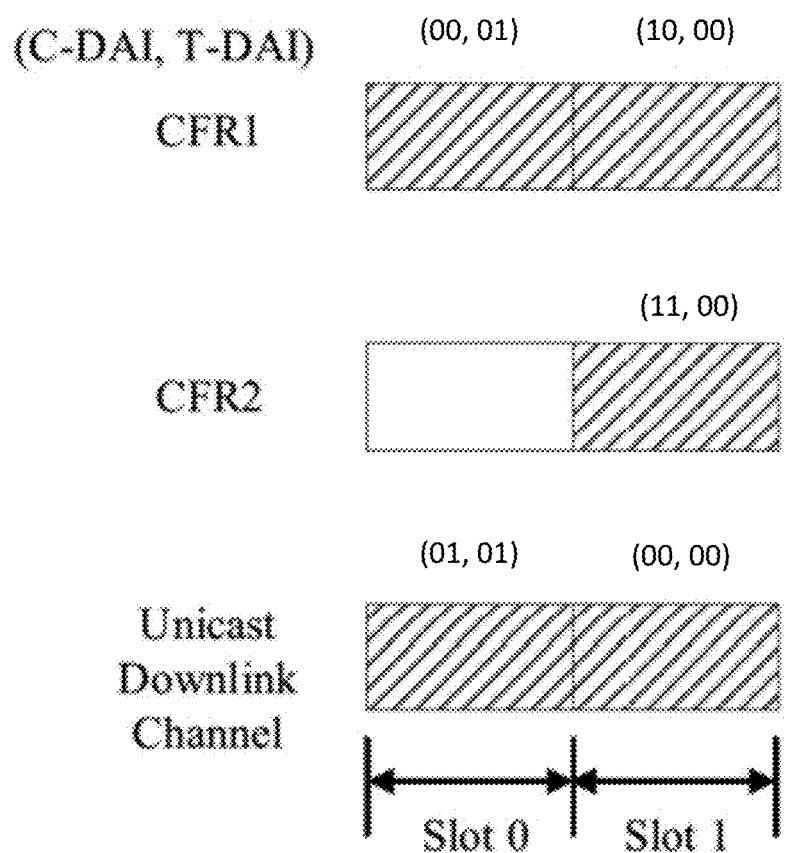
FIG. 14 illustrates an example of generating HARQ-ACK information for at least one unicast downlink channel and HARQ-ACK information for at least one group-common downlink channel based on a unified set of DCIs in accordance with some embodiments.

FIG. 14 illustrates an example of generating HARQ-ACK information for at least one unicast downlink channel and HARQ-ACK information for at least one group-common downlink channel based on a unified set of DCIS. In this example, the same DAI may be used for both unicast and multicast PDSCH. For example, the counter DAI value and the total DAI value may be applied to both unicast and multicast PDSCH transmissions.

In FIG. 14, the box filled by the slashes indicates that the group-common downlink channel corresponding to the CFR or unicast downlink channel is scheduled during the slot, and the empty box indicates that the group-common downlink channel corresponding to the CFR or unicast downlink channel is not scheduled during the slot.

In slot 0, only the group-common downlink channel corresponding to CFR1 and the unicast downlink channel are scheduled, while the group-common downlink channel corresponding to CFR2 is not scheduled. Accordingly, in slot 0, the value of (C-DAI, T-DAI) for CFR 1 is (00, 01), and the value of (C-DAI, T-DAI) for the unicast downlink channel is (01, 01). As this embodiment counts the DAIs for unicast and multicast PDSCH transmissions together, the T-DAI for slot 0 in both the CFR1 and unicast downlink channel is based on the transmissions in both the CFRs and the unicast channel, the C-DAIs are also incremented based on both the CFRs and the unicast channel (thus, C-DAI of CFR 1 is (00) and the C-DAI of the unicast downlink channel is (01)).

In slot 1, the group-common downlink channel corresponding to CFR1, the group-common downlink channel corresponding to CFR2, and the unicast downlink channel are all scheduled. Accordingly, in slot 1, the value of (C-DAI, T-DAI) for CFR 1 is (10, 00), the value of (C-DAI, T-DAI) for CFR 2 is (11,00), the value of (C-DAI, T-DAI) for the unicast downlink channel is (00, 00).

As this embodiment counts the DAIS for unicast and multicast PDSCH transmissions together, the T-DAIS of CFR1 and unicast downlink channel for slot 0 are based on the number of transmissions of CFR1, CFR2, and the unicast downlink channel in slot 0; the C-DAIS are sequentially incremented based on transmissions in CFR1 in slot 0, unicast downlink channel in slot 0, CFR1 in slot 1, CFR2 in slot 1, and unicast downlink channel in slot 1; and the T-DAIS for slot 1 are based on transmissions of CFR1, CFR2, and the unicast downlink channel in slots 0 and 1.

If a plurality of CFRs are configured, one CFR may be treated as one cell for determining the DAI value.

The embodiments of the present disclosure provide an apparatus for a user equipment (UE), the apparatus comprising: one or more processors configured to perform steps of the method according to the present disclosure.

The embodiments of the present disclosure provide a computer readable medium having computer programs stored thereon which, when executed by one or more processors, cause an apparatus to perform steps of the method according to the present disclosure.

The embodiments of the present disclosure provide an apparatus for a communication device, comprising means for performing steps of the method according to the present disclosure.

The embodiments of the present disclosure provide an apparatus for a computer program product comprising computer programs which, when executed by one or more processors, cause an apparatus to perform steps of the method according to the present disclosure.

Figure 15:
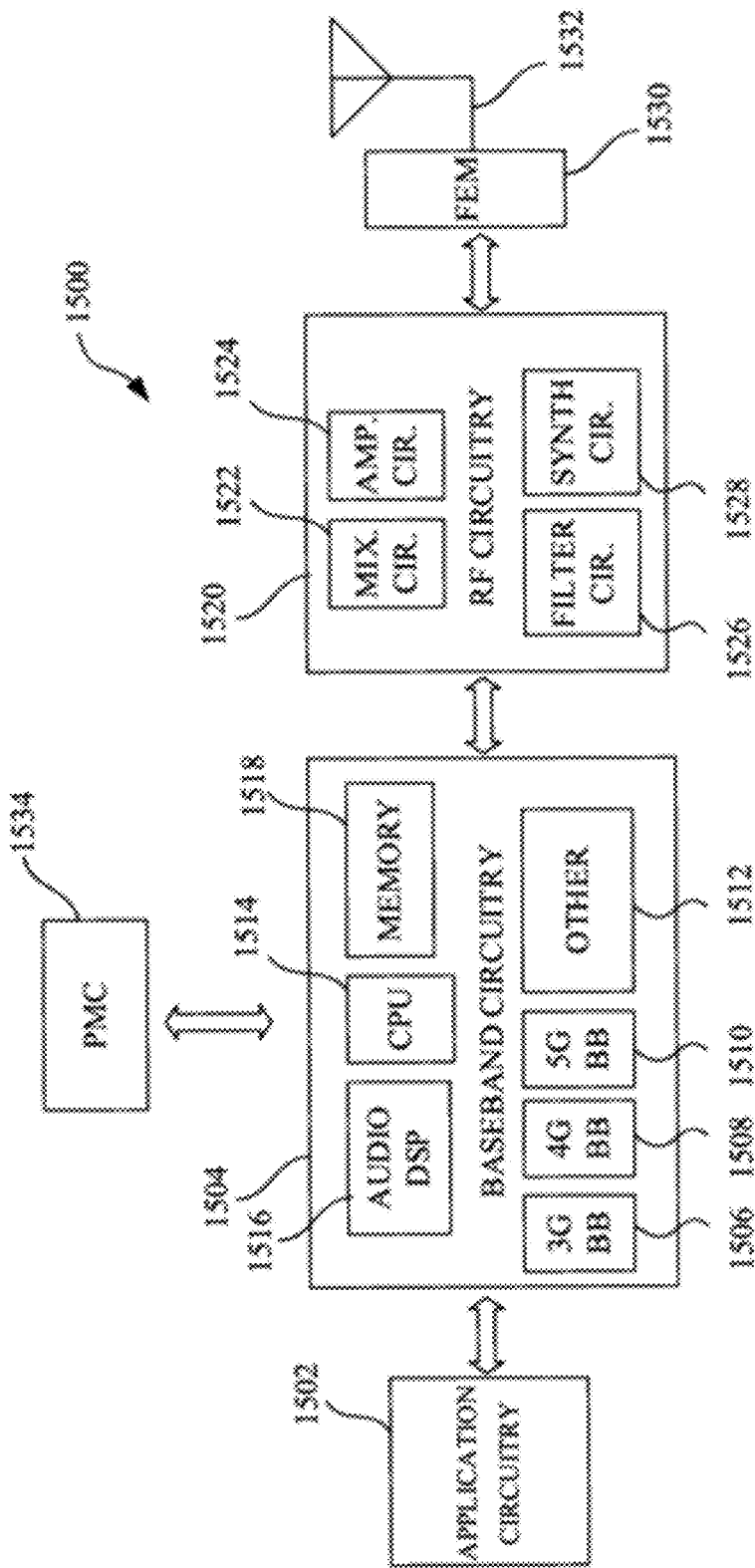
FIG. 15 illustrates a communication device (e.g. a UE or a base station) in accordance with some embodiments.

FIG. 15 illustrates example components of a device 1500 in accordance with some embodiments. In some embodiments, the device 1500 may include application circuitry 1502, baseband circuitry 1504, Radio Frequency (RF) circuitry (shown as RF circuitry 1520), front-end module (FEM) circuitry (shown as FEM circuitry 1530), one or more antennas 1532, and power management circuitry (PMC) (shown as PMC 1534) coupled together at least as shown. The components of the illustrated device 1500 may be included in a UE or a RAN node. In some embodiments, the device 1500 may include fewer elements (e.g., a RAN node may not utilize application circuitry 1502, and instead include a processor/controller to process IP data received from an EPC). In some embodiments, the device 1500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors or application processors). The processors may be coupled with or may include memory/storage and may be configured to execute instructions stored in the memory/storage to enable various applications or operating systems to run on the device 1500. In some embodiments, processors of application circuitry 1502 may process IP data packets received from an EPC.

The baseband circuitry 1504 may include circuitry such as, but not limited to, one or more single-core or multi-core processors. The baseband circuitry 1504 may include one or more baseband processors or control logic to process baseband signals received from a receive signal path of the RF circuitry 1520 and to generate baseband signals for a transmit signal path of the RF circuitry 1520. The baseband circuitry 1504 may interface with the application circuitry 1502 for generation and processing of the baseband signals and for controlling operations of the RF circuitry 1520. For example, in some embodiments, the baseband circuitry 1504 may include a third generation (3G) baseband processor (3G baseband processor 1506), a fourth generation (4G) baseband processor (4G baseband processor 1508), a fifth generation (5G) baseband processor (5G baseband processor 1510), or other baseband processor(s) 1512 for other existing generations, generations in development or to be developed in the future (e.g., second generation (2G) or sixth generation (6G)). The baseband circuitry 1504 (e.g., one or more of baseband processors) may handle various radio control functions that enable communication with one or more radio networks via the RF circuitry 1520. In other embodiments, some or all of the functionality of the illustrated baseband processors may be included in modules stored in the memory 1518 and executed via a Central Processing Unit (CPU 1514). The radio control functions may include, but are not limited to, signal modulation/demodulation, encoding/decoding, and radio frequency shifting. In some embodiments, modulation/demodulation circuitry of the baseband circuitry 1504 may include Fast-Fourier Transform (FFT), precoding, or constellation mapping/demapping functionality. In some embodiments, encoding/decoding circuitry of the baseband circuitry 1504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include a digital signal processor (DSP), such as one or more audio DSP(s) 1516. The one or more audio DSP(s) 1516 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1504 is configured to support radio communications of more than one wireless protocol may be referred to as multi-mode baseband circuitry.

The RF circuitry 1520 may enable communication with wireless networks using modulated electromagnetic radiation through a non-solid medium. In various embodiments, the RF circuitry 1520 may include, for example, switches, filters, and amplifiers to facilitate the communication with the wireless network. The RF circuitry 1520 may include a receive signal path which may include circuitry to down-convert RF signals received from the FEM circuitry 1530 and provide baseband signals to the baseband circuitry 1504. The RF circuitry 1520 may also include a transmit signal path which may include circuitry to up-convert baseband signals provided by the baseband circuitry 1504 and provide RF output signals to the FEM circuitry 1530 for transmission. In some embodiments, the receive signal path of the RF circuitry 1520 may include mixer circuitry 1522, amplifier circuitry 1524 and filter circuitry 1526. In some embodiments, the transmit signal path of the RF circuitry 1520 may include filter circuitry 1526 and mixer circuitry 1522. The RF circuitry 1520 may also include synthesizer circuitry 1528 for synthesizing a frequency for use by the mixer circuitry 1522 of the receive signal path and the transmit signal path. In some embodiments, the mixer circuitry 1522 of the receive signal path may be configured to down-convert RF signals received from the FEM circuitry 1530 based on the synthesized frequency provided by synthesizer circuitry 1528. The amplifier circuitry 1524 may be configured to amplify the down-converted signals and the filter circuitry 1526 may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, the mixer circuitry 1522 of the receive signal path may comprise passive mixers, although the scope of the embodiments is not limited in this respect.

In some embodiments, the mixer circuitry 1522 of the transmit signal path may be configured to up-convert input baseband signals based on the synthesized frequency provided by the synthesizer circuitry 1528 to generate RF output signals for the FEM circuitry 1530. The baseband signals may be provided by the baseband circuitry 1504 and may be filtered by the filter circuitry 1526.

In some embodiments, the mixer circuitry 1522 of the receive signal path and the mixer circuitry 1522 of the transmit signal path may include two or more mixers and may be arranged for quadrature downconversion and upconversion, respectively. In some embodiments, the mixer circuitry 1522 of the receive signal path and the mixer circuitry 1522 of the transmit signal path may include two or more mixers and may be arranged for image rejection (e.g., Hartley image rejection). In some embodiments, the mixer circuitry 1522 of the receive signal path and the mixer circuitry 1522 may be arranged for direct downconversion and direct upconversion, respectively. In some embodiments, the mixer circuitry 1522 of the receive signal path and the mixer circuitry 1522 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1520 may include analog-to-digital converter (ADC) and digital-to-analog converter (DAC) circuitry and the baseband circuitry 1504 may include a digital baseband interface to communicate with the RF circuitry 1520.

In some dual-mode embodiments, a separate radio IC circuitry may be provided for processing signals for each spectrum, although the scope of the embodiments is not limited in this respect.

In some embodiments, the synthesizer circuitry 1528 may be a fractional –N synthesizer or a fractional N/N+1 synthesizer, although the scope of the embodiments is not limited in this respect as other types of frequency synthesizers may be suitable. For example, synthesizer circuitry 1528 may be a delta-sigma synthesizer, a frequency multiplier, or a synthesizer comprising a phase-locked loop with a frequency divider.

The synthesizer circuitry 1528 may be configured to synthesize an output frequency for use by the mixer circuitry 1522 of the RF circuitry 1520 based on a frequency input and a divider control input. In some embodiments, the synthesizer circuitry 1528 may be a fractional N/N+1 synthesizer.

In some embodiments, frequency input may be provided by a voltage controlled oscillator (VCO), although that is not a requirement. Divider control input may be provided by either the baseband circuitry 1504 or the application circuitry 1502 (such as an applications processor) depending on the desired output frequency. In some embodiments, a divider control input (e.g., N) may be determined from a look-up table based on a channel indicated by the application circuitry 1502.

Synthesizer circuitry 1528 of the RF circuitry 1520 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1528 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1520 may include an IQ/polar converter.

The FEM circuitry 1530 may include a receive signal path which may include circuitry configured to operate on RF signals received from one or more antennas 1532, amplify the received signals and provide the amplified versions of the received signals to the RF circuitry 1520 for further processing. The FEM circuitry 1530 may also include a transmit signal path which may include circuitry configured to amplify signals for transmission provided by the RF circuitry 1520 for transmission by one or more of the one or more antennas 1532. In various embodiments, the amplification through the transmit or receive signal paths may be done solely in the RF circuitry 1520, solely in the FEM circuitry 1530, or in both the RF circuitry 1520 and the FEM circuitry 1530.

In some embodiments, the FEM circuitry 1530 may include a TX/RX switch to switch between transmit mode and receive mode operation. The FEM circuitry 1530 may include a receive signal path and a transmit signal path. The receive signal path of the FEM circuitry 1530 may include an LNA to amplify received RF signals and provide the amplified received RF signals as an output (e.g., to the RF circuitry 1520). The transmit signal path of the FEM circuitry 1530 may include a power amplifier (PA) to amplify input RF signals (e.g., provided by the RF circuitry 1520), and one or more filters to generate RF signals for subsequent transmission (e.g., by one or more of the one or more antennas 1532).

In some embodiments, the PMC 1534 may manage power provided to the baseband circuitry 1504. In particular, the PMC 1534 may control power-source selection, voltage scaling, battery charging, or DC-to-DC conversion. The PMC 1534 may often be included when the device 1500 is capable of being powered by a battery, for example, when the device 1500 is included in a UE. The PMC 1534 may increase the power conversion efficiency while providing desirable implementation size and heat dissipation characteristics.

FIG. 15 shows the PMC 1534 coupled only with the baseband circuitry 1504. However, in other embodiments, the PMC 1534 may be additionally or alternatively coupled with, and perform similar power management operations for, other components such as, but not limited to, the application circuitry 1502, the RF circuitry 1520, or the FEM circuitry 1530.

In some embodiments, the PMC 1534 may control, or otherwise be part of, various power saving mechanisms of the device 1500. For example, if the device 1500 is in an RRC Connected state, where it is still connected to the RAN node as it expects to receive traffic shortly, then it may enter a state known as Discontinuous Reception Mode (DRX) after a period of inactivity. During this state, the device 1500 may power down for brief intervals of time and thus save power.

If there is no data traffic activity for an extended period of time, then the device 1500 may transition off to an RRC Idle state, where it disconnects from the network and does not perform operations such as channel quality feedback or handover. The device 1500 goes into a very low power state and it performs paging where again it periodically wakes up to listen to the network and then powers down again. The device 1500 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1502 and processors of the baseband circuitry 1504 may be used to execute elements of one or more instances of a protocol stack. For example, processors of the baseband circuitry 1504, alone or in combination, may be used to execute Layer 3, Layer 2, or Layer 1 functionality, while processors of the application circuitry 1502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 16:
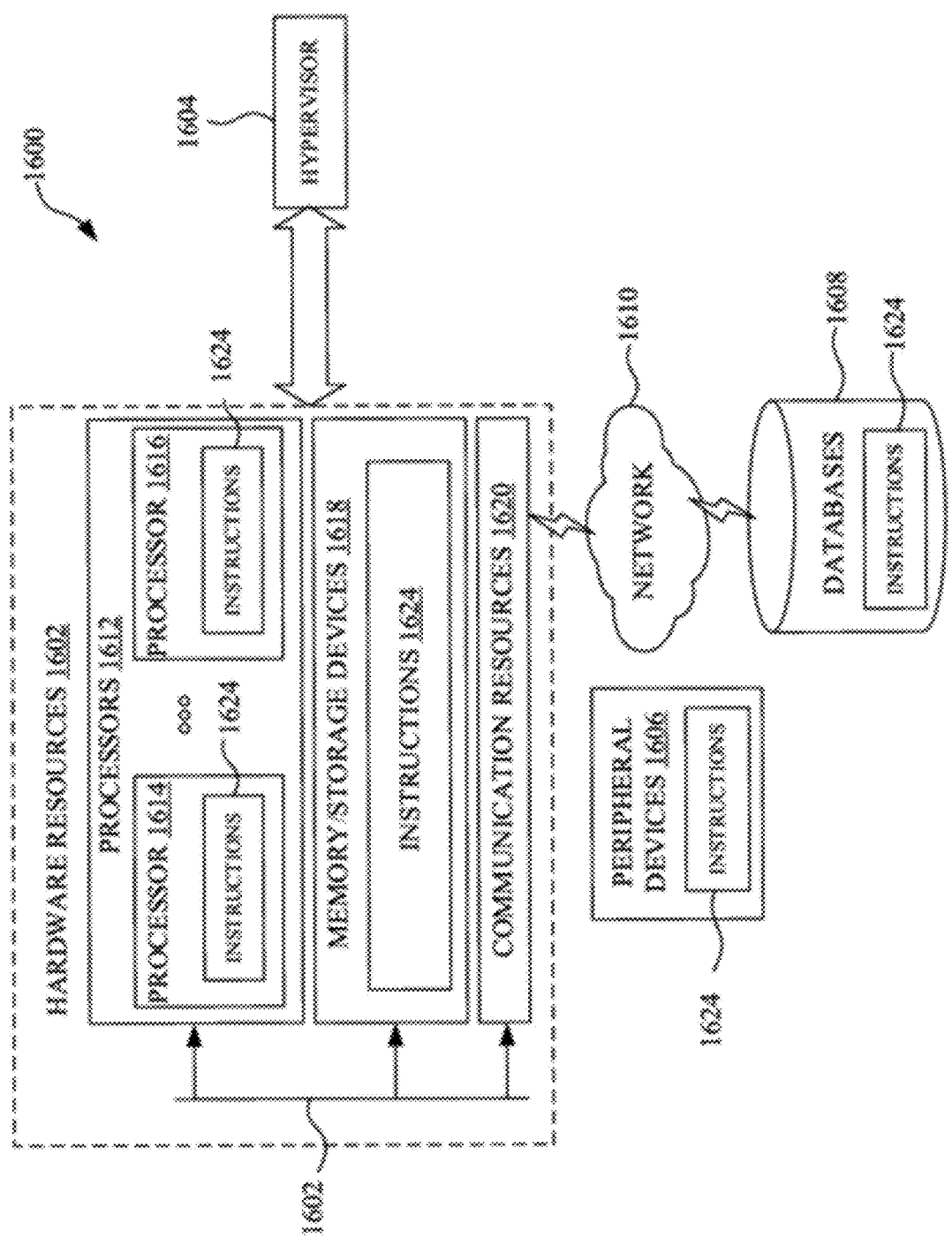
FIG. 16 illustrates components in accordance with some embodiments.

FIG. 16 is a block diagram illustrating components 1600, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1602 including one or more processors 1612 (or processor cores), one or more memory/storage devices 1618, and one or more communication resources 1620, each of which may be communicatively coupled via a bus 1622. For embodiments where node virtualization (e.g., NFV) is utilized, a hypervisor 1604 may be executed to provide an execution environment for one or more network slices/sub-slices to utilize the hardware resources 1602.

The processors 1612 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1614 and a processor 1616.

The memory/storage devices 1618 may include main memory, disk storage, or any suitable combination thereof. The memory/storage devices 1618 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The communication resources 1620 may include interconnection or network interface components or other suitable devices to communicate with one or more peripheral devices 1606 or one or more databases 1608 via a network 1610. For example, the communication resources 1620 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1624 may comprise software, a program, an application, an applet, an app, or other executable code for causing at least any of the processors 1612 to perform any one or more of the methodologies discussed herein. The instructions 1624 may reside, completely or partially, within at least one of the processors 1612 (e.g., within the processor's cache memory), the memory/storage devices 1618, or any suitable combination thereof. Furthermore, any portion of the instructions 1624 may be transferred to the hardware resources 1602 from any combination of the peripheral devices 1606 or the databases 1608. Accordingly, the memory of the processors 1612, the memory/storage devices 1618, the peripheral devices 1606, and the databases 1608 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

Figure 17:
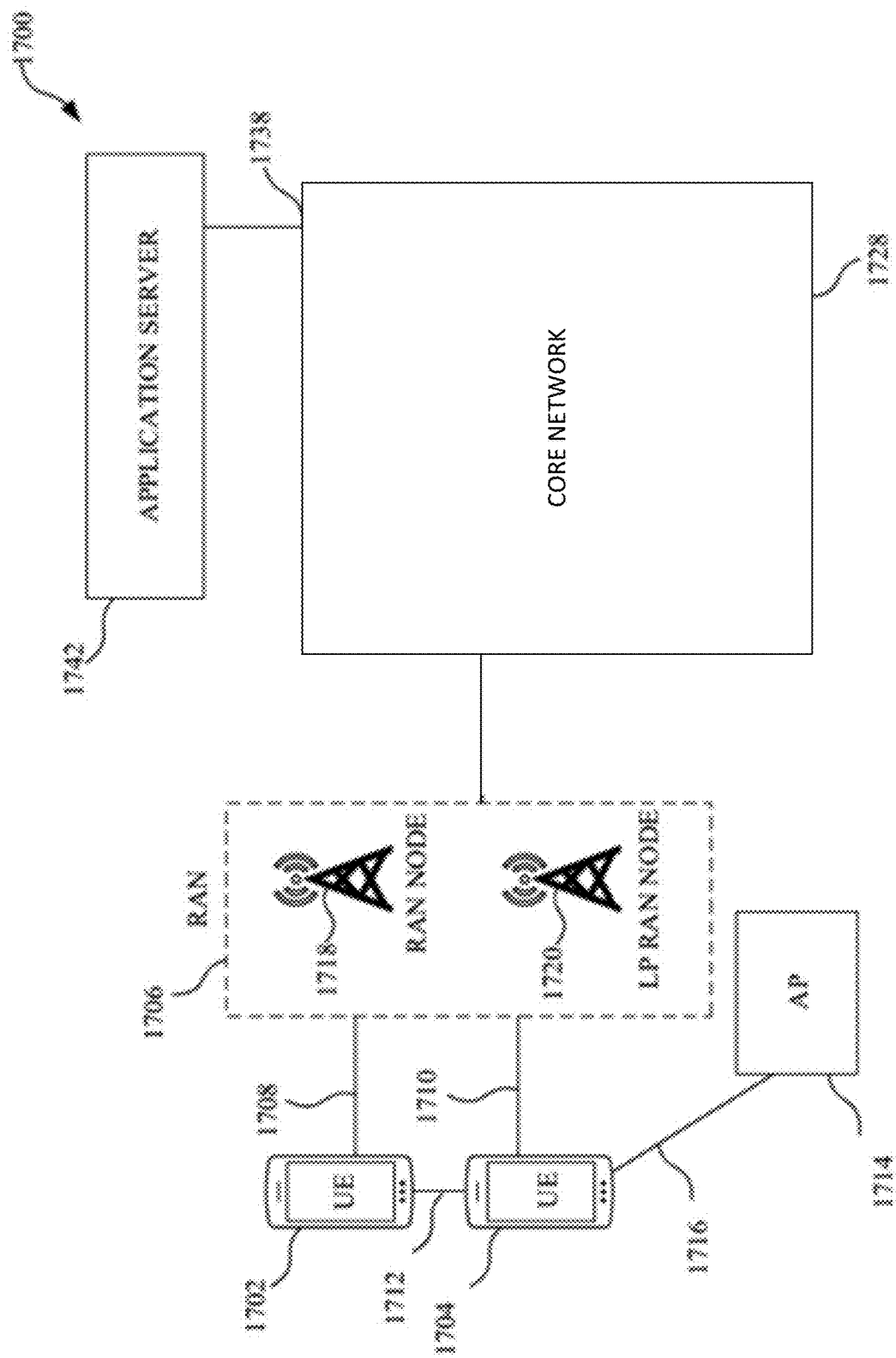
FIG. 17 illustrates an architecture of a wireless network in accordance with some embodiments.

FIG. 17 illustrates an architecture of a system 1700 of a network in accordance with some embodiments. The system 1700 includes one or more user equipment (UE), shown in this example as a UE 1702 and a UE 1704. The UE 1702 and the UE 1704 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1702 and the UE 1704 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UE 1702 and the UE 1704 may be configured to connect, e.g., communicatively couple, with a radio access network (RAN), shown as RAN 1706. The RAN 1706 may be, for example, an Evolved Universal Mobile Telecommunications System (UMTS) Terrestrial Radio Access Network (E-UTRAN), a NextGen RAN (NG RAN), or some other type of RAN. The UE 1702 and the UE 1704 utilize connection 1708 and connection 1710, respectively, each of which comprises a physical communications interface or layer (discussed in further detail below); in this example, the connection 1708 and the connection 1710 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1702 and the UE 1704 may further directly exchange communication data via a ProSe interface 1712. The ProSe interface 1712 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1704 is shown to be configured to access an access point (AP), shown as AP 1734, via connection 1716. The connection 1716 can comprise a local wireless connection, such as a connection consistent with any IEEE 802.13 protocol, wherein the AP 1714 would comprise a wireless fidelity (WiFi®) router. In this example, the AP 1714 may be connected to the Internet without connecting to the core network of the wireless system (described in further detail below).

The RAN 1706 can include one or more access nodes that enable the connection 1708 and the connection 1710. These access nodes (ANs) can be referred to as base stations (BSs), NodeBs, evolved NodeBs (eNBs), next Generation NodeBs (base station), RAN nodes, and so forth, and can comprise ground stations (e.g., terrestrial access points) or satellite stations providing coverage within a geographic area (e.g., a cell). The RAN 1706 may include one or more RAN nodes for providing macrocells, e.g., macro RAN node 1718, and one or more RAN nodes for providing femtocells or picocells (e.g., cells having smaller coverage areas, smaller user capacity, or higher bandwidth compared to macrocells), e.g., a low power (LP) RAN node such as LP RAN node 1720. Any of the macro RAN node 1718 and the LP RAN node 1720 can terminate the air interface protocol and can be the first point of contact for the UE 1702 and the UE 1704. In some embodiments, any of the macro RAN node 1718 and the LP RAN node 1720 can fulfill various logical functions for the RAN 1706 including, but not limited to, radio network controller (RNC) functions such as radio bearer management, uplink and downlink dynamic radio resource management and data packet scheduling, and mobility management.

In accordance with some embodiments, the UE 1702 and the UE 1704 can be configured to communicate using Orthogonal Frequency-Division Multiplexing (OFDM) communication signals with each other or with any of the macro RAN node 1718 and the LP RAN node 1720 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1718 and the LP RAN node 1720 to the UE 1702 and the UE 1704, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises an amount of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1702 and the UE 1704. The physical downlink control channel (PDCCH) may carry information about the transport format and resource allocations related to the PDSCH channel, among other things. It may also inform the UE 1702 and the UE 1704 about the transport format, resource allocation, and H-ARQ (Hybrid Automatic Repeat Request) information related to the uplink shared channel. Typically, downlink scheduling (assigning control and shared channel resource blocks to the UE 1704 within a cell) may be performed at any of the macro RAN node 1718 and the LP RAN node 1720 based on channel quality information fed back from any of the UE 1702 and UE 1704. The downlink resource assignment information may be sent on the PDCCH used for (e.g., assigned to) each of the UE 1702 and the UE 1704.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1706 is communicatively coupled to a core network (CN), shown as CN 1728. In embodiments, the CN 1728 may be an evolved packet core (EPC) network, a NextGen Packet Core (NPC) network, or some other type of CN.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

The following examples pertain to further embodiments.

Example 1 is a method for constructing a hybrid automatic repeat request—acknowledge character (HARQ-ACK) codebook, performed at a user equipment (UE), comprising: generating HARQ-ACK information for at least one unicast downlink channel and HARQ-ACK information for at least one group-common downlink channel for the at least one unicast downlink channel and the at least one group-common downlink channel; and constructing the HARQ-ACK codebook based on the HARQ-ACK information for the at least one unicast downlink channel and the HARQ-ACK information for the at least one group-common downlink channel, wherein each group-common downlink channel associates with a MBS service.

Example 2 is the method of Example 1, wherein the HARQ-ACK codebook of the UE is configured to be a semi-static codebook, and wherein generating HARQ-ACK information for at least one unicast downlink channel and HARQ-ACK information for at least one group-common downlink channel comprises: determining a combined time domain resource allocation (TDRA) table based on a TDRA table corresponding to the at least one unicast downlink channel and at least one TDRA table corresponding to the at least one group-common downlink channel; determining a valid start and length indicator value (SLIV) based on the combined TDRA table, and constructing a valid TDRA table based on the valid SLIV; and generating the HARQ-ACK information for the at least one unicast downlink channel and the HARQ-ACK information for the at least one group-common downlink channel based on the valid TDRA table.

Example 3 is the method of Example 2, wherein, for each group-common downlink channel, the at least one TDRA table corresponding to the at least one group-common downlink channel includes a TDRA table corresponding to the group-common downlink channel.

Example 4 is the method of Example 2, wherein the at least one TDRA table corresponding to the at least one group-common downlink channel is a common TDRA table corresponding to the at least group-common downlink channel.

Example 5 is the method of Example 2, wherein the constructing the HARQ-ACK codebook based on the HARQ-ACK information for the at least one unicast downlink channel and the HARQ-ACK information for the at least one group-common downlink channel comprises: concatenating the HARQ-ACK information for the at least one unicast downlink channel and the HARQ-ACK information for the at least one group-common downlink channel according to reception timing of the at least one unicast downlink channel and the at least one group-common downlink channel in a same slot.

Example 6 is the method of Example 1, wherein the HARQ-ACK codebook of the UE is a semi-static codebook, and wherein the generating HARQ-ACK information for at least one unicast downlink channel and HARQ-ACK information for at least one group-common downlink channel comprises: generating the HARQ-ACK information for the at least one unicast downlink channel based on a TDRA table corresponding to the at least one unicast downlink channel; and generating the HARQ-ACK information for the at least one group-common downlink channel based on a number of the at least one group-common downlink channel.

Example 7 is the method of Example 6, wherein the constructing the HARQ-ACK codebook based on the HARQ-ACK information for the at least one unicast downlink channel and the HARQ-ACK information for the at least one group-common downlink channel comprises: concatenating HARQ-ACK information for slots in a HARQ window according to a sequence of the slots in the HARQ window, wherein, for each slot in the HARQ window, the HARQ-ACK information for the at least one unicast downlink channel and the HARQ-ACK information for the at least one group-common downlink channel of the slot are placed in the HARQ-ACK information for the slot in sequence.

Example 8 is the method of Example 7, wherein, for each slot in the HARQ window, for each group-common downlink channel, the HARQ-ACK information for the group-common downlink channel of the slot is placed in the HARQ-ACK information for the at least one group-common downlink channel of the slot according to a physical resource block (PRB) index of the group-common downlink channel.

Example 9 is the method of Example 6, wherein the constructing the HARQ-ACK codebook based on the HARQ-ACK information for the at least one unicast downlink channel and the HARQ-ACK information for the at least one group-common downlink channel comprises: concatenating HARQ-ACK information for the at least one unicast downlink channel and HARQ-ACK information for the at least one group-common downlink channel of a HRAQ window in sequence, wherein, for each group-common downlink channel, HARQ-ACK information for the group-common downlink channel of the HARQ window is placed in the HARQ-ACK information for the at least one group-common downlink channel of the HARQ window according to an PRB index of the group-common downlink channel.

Example 10 is the method of Example 9, wherein, for each slot in the HARQ window, the HARQ-ACK information for the at least one unicast downlink channel of the slot is placed in the HARQ-ACK information for the at least one unicast downlink channel of the HARQ window according to a sequence of the slot in the HARQ window, and for each group-common downlink channel, the HARQ-ACK information for the group-common downlink channel of the slot are placed in the HARQ-ACK information for the group-common downlink channel of the HARQ window according to the sequence of the slot in the HARQ window.

Example 11 is the method of Example 1, wherein the HARQ-ACK codebook of the UE is configured to be a semi-static codebook, and wherein generating HARQ-ACK information for at least one unicast downlink channel and HARQ-ACK information for at least one group-common downlink channel comprises: generating the HARQ-ACK information for the at least one unicast downlink channel based on a TDRA table corresponding to the at least one unicast downlink channel; and generating, for each common frequency resource (CFR) of the at least one group-common downlink channel, HARQ-ACK information for the CFR based on at least one TDRA table corresponding to the CFR.

Example 12 is the method of Example 11, wherein, for each one group-common downlink channel in each CFR, the at least one TDRA table corresponding to the CFR includes a TDRA table corresponding to the group-common downlink channel.

Example 13 is the method of Example 11, wherein the constructing the HARQ-ACK codebook based on the HARQ-ACK information for the at least one unicast downlink channel and the HARQ-ACK information for the at least one group-common downlink channel comprises: concatenating HARQ-ACK information for slots in a HARQ window according to a sequence of the slots in a HARQ window, wherein, for each slot in the HARQ window, the HARQ-ACK information for the slot includes the HARQ-ACK information for the at least one unicast downlink channel and the HARQ-ACK information for the at least one group-common downlink channel of the slot in sequence.

Example 14 is the method of Example 13, wherein, for each slot in the HARQ window, for each CFR of the at least one group-common downlink channel, the HARQ-ACK information for the CFR of the slot is placed in the HARQ-ACK information for the at least one group-common downlink channel of the slot according to an index of the CFR.

Example 15 is the method of Example 11, wherein the constructing the HARQ-ACK codebook based on the HARQ-ACK information for the at least one unicast downlink channel and the HARQ-ACK information for the at least one group-common downlink channel comprises: concatenating HARQ-ACK information for the at least one unicast downlink channel and the HARQ-ACK information for the at least one group-common downlink channel of a HRAQ window in sequence, wherein, for each CFR of the at least one group-common downlink channel of the HARQ window, HARQ-ACK information for the CFR of the HARQ window is placed in the HARQ-ACK information for the at least one group-common downlink channel of the HARQ window according to an index of the CFR.

Example 16 is the method of Example 15, wherein, for each slot in the HARQ window, the HARQ-ACK information for the at least one unicast downlink channel of the slot is placed in the HARQ-ACK information for the at least one unicast downlink channel of the HARQ window according to a sequence of the slot in the HARQ window, and for each CFR, the HARQ-ACK information for the CFR of the slot are placed in the HARQ-ACK information for the CFR of the HARQ window according to the sequence of the slot in the HARQ window.

Example 17 is the method of any one of Examples 3 and 12, wherein, for a group-common downlink channel configured with a TDRA table, the TDRA table corresponding to the group-common downlink channel is the TDRA table configured for the group-common downlink channel.

Example 18 is the method of Example 17, wherein, for a group-common downlink channel that is not configured with a TDRA table, the TDRA table corresponding to the group-common downlink channel is a common TDRA table configured for the at least one group-common downlink channel, if the at least one group-common downlink channel is configured with the common TDRA table.

Example 19 is the method of Example 18, wherein, for the group-common downlink channel that is not configured with a TDRA table, the TDRA table corresponding to the group-common downlink channel is a TDRA table in the pdsch-ConfigCommon, if the pdsch-ConfigCommon is configured for the UE and the at least one group-common downlink channel is not configured with the common TDRA table is Example 20 is the method of Example 19, wherein, for the group-common downlink channel that is not configured with a TDRA table, the TDRA table corresponding to the group-common downlink channel is a default TDRA table, if the pdsch-ConfigCommon is not configured for the UE and the at least one group-common downlink channel is not configured with the common TDRA table.

Example 21 is the method of any one of Examples 5-15, wherein the unicast downlink channel is a unicast PDSCH or a SPS release.

Example 22 is the method of Example 20, wherein a TDRA table corresponding to the SPS release is a TDRA table corresponding to an activation DCI or a released DCI is Example 23 is the method of Example 1, wherein the HARQ-ACK codebook of the UE is configured to be a dynamic codebook, and wherein generating HARQ-ACK information for at least one unicast downlink channel and HARQ-ACK information for at least one group-common downlink channel comprises: generating the HARQ-ACK information for the at least one unicast downlink channel based on a set of downlink assignment indexes (DAI) corresponding to the at least one unicast downlink channel, which include a Counter DAI and a Total DAI corresponding to the at least one unicast downlink channel; and generating the HARQ-ACK information for the at least one group-common downlink channel based on a set of DAIs corresponding to the at least one group-common downlink channel, which includes a Counter DAI and a Total DAI corresponding to the at least one group-common downlink channel.

Example 24 is the method of Example 1, wherein the HARQ-ACK codebook of the UE is configured to be a dynamic codebook, and wherein generating HARQ-ACK information for at least one unicast downlink channel and HARQ-ACK information for at least one group-common downlink channel comprises: generating the HARQ-ACK information for the at least one unicast downlink channel based on a set of DAIs corresponding to the at least one unicast downlink channel, which include a Counter DAI and a Total DAI corresponding to the at least one unicast downlink channel; and generating the HARQ-ACK information for the at least one group-common downlink channel based on sets of DAIs corresponding to CFRs of the at least one unicast downlink channel, comprising: generating, for each CFR of the at least group-common downlink channel, HARQ-ACK information for the CFR based on a set of DAIs corresponding to the CFR, which includes a Counter DAI and a Total DAI corresponding to the CFR.

Example 25 is the method of any one of Examples 23-24, wherein the constructing the HARQ-ACK codebook based on the HARQ-ACK information for the at least one unicast downlink channel and the HARQ-ACK information for the at least one group-common downlink channel comprises: concatenating the HARQ-ACK information for the at least one unicast downlink channel and the HARQ-ACK information for the at least one group-common downlink channel in sequence.

Example 26 is the method of Example 25, wherein, the HARQ-ACK information for the at least one unicast downlink channel is concatenated according to the Counter DAI and the Total DAI corresponding to the at least one unicast downlink channel, and wherein, the HARQ-ACK information for the at least one group-common downlink channel is concatenated according to the Counter DAI and the Total DAI corresponding to the at least one group-common downlink channel.

Example 27 is the method of Example 26, wherein, for each CFR of the at least group-common downlink channel, the HARQ-ACK information for the CFR is placed in the HARQ-ACK information for the at least one group-common downlink channel according to an index of the CFR.

Example 28 is the method of Example 27, wherein, the HARQ-ACK information for the at least one unicast downlink channel is concatenated according to the Counter DAI and the Total DAI corresponding to the at least one unicast downlink channel, and wherein, for each CFR of the at least group-common downlink channel, the HARQ-ACK information for the CFR is concatenated according to the Counter DAI and the Total DAI corresponding to the CFR.

Example 29 is the method of Example 1, wherein the HARQ-ACK codebook of the UE is configured to be a dynamic codebook, and wherein generating HARQ-ACK information for at least one unicast downlink channel and HARQ-ACK information for at least one group-common downlink channel comprises: generating the HARQ-ACK information for the at least one unicast downlink channel based on a set of DAIS corresponding to the at least one unicast downlink channel; and generating the HARQ-ACK information for the at least one group-common downlink channel, wherein the at least one group-common downlink channel includes at least one MBS SPS PDSCH and at least one other group-common PDSCH, comprising: generating the HARQ-ACK information for the at least one MBS SPS PDSCH based on a number of the at least one group-common MBS SPS PDSCH; and generating the HARQ-ACK information for the at least one other group-common PDSCH based on a set of DAIS for the at least one other group-common PDSCH.

Example 30 is the method of Example 29, wherein the constructing the HARQ-ACK codebook based on the HARQ-ACK information for the at least one unicast downlink channel and the HARQ-ACK information for the at least one group-common downlink channel comprises: concatenating the HARQ-ACK information for the at least one unicast downlink channel, the HARQ-ACK information for the at least one MBS SPS PDSCH, and the HARQ-ACK information for the at least one other group-common PDSCH in sequence; or concatenating the HARQ-ACK information for the at least one MBS SPS PDSCH, the HARQ-ACK information for the at least one unicast downlink channel and the HARQ-ACK information for the at least one other group-common PDSCH in sequence; or concatenating the HARQ-ACK information for the at least one unicast downlink channel, the HARQ-ACK information for the at least one other group-common PDSCH and the HARQ-ACK information for the at least one MBS SPS PDSCH in sequence.

Example 31 is the method of Example 1, wherein the HARQ-ACK codebook of the UE is configured to be a dynamic codebook, and wherein generating HARQ-ACK information for at least one unicast downlink channel and HARQ-ACK information for at least one group-common downlink channel comprises: generating the HARQ-ACK information for the at least one unicast downlink channel and the HARQ-ACK information for the at least one group-common downlink channel based on a common set of DAIs, which includes a Counter DAI and a Total DAI.

Example 32 is the method of Example 31, wherein the constructing the HARQ-ACK codebook based on the HARQ-ACK information for the at least one unicast downlink channel and the HARQ-ACK information for the at least one group-common downlink channel comprises: concatenating the HARQ-ACK information for the at least one unicast downlink channel and the HARQ-ACK information for the at least one group-common downlink channel according to the Counter DAI and Total DAI of the common set of DAIs.

Example 33 is an apparatus for a user equipment (UE), the apparatus comprising: one or more processors configured to perform steps of the method according to any one of Examples 1-32.

Example 34 is a computer readable medium having computer programs stored thereon which, when executed by one or more processors, cause an apparatus to perform steps of the method according to any one of Examples 1-32.

Example 35 is an apparatus for a communication device, comprising means for performing steps of the method according to any one of Examples 1-32.

Example 36 is a computer program product comprising computer programs which, when executed by one or more processors, cause an apparatus to perform steps of the method according to any one of Examples 1-32.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters, attributes, or aspects of one embodiment can be used in another embodiment. The parameters, attributes, or aspects are merely described in one or more embodiments for clarity, and it is recognized that the parameters, attributes, or aspects can be combined with or substituted for parameters, attributes, or aspects of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. One or more non-transitory, computer-readable media having instructions that, when executed, cause baseband circuitry to:
   generate first hybrid automatic repeat request-acknowledgment (HARQ-ACK) information for a unicast downlink channel transmission based on a first set of downlink assignment indexes (DAIs) that is based on one or more unicast transmissions;
   generate second HARQ-ACK information for a first group-common downlink channel transmission in a first common frequency resource (CFR) based on a second set of DAIs that is based on one or more multicast transmissions;
   generate third HARQ-ACK information for a second group-common downlink channel transmission in a second CFR based on a third set of DAIs that is based on one or more multicast transmissions, wherein a counter DAI of the third set of DAIs is sequentially incremented with respect to a counter DAI of the second set of DAIs; and
   construct a dynamic HARQ-ACK codebook by concatenating the first HARQ-ACK information, the second HARQ-ACK information, and third HARQ-ACK information in sequence.

2. The one or more non-transitory, computer-readable media of claim 1, wherein the instructions, when executed, further cause the baseband circuitry to:
   concatenate the first HARQ-ACK information based on the first set of DAIs and the second HARQ-ACK information based on the second set of DAIs.

3. The one or more non-transitory, computer-readable media of claim 1, wherein the first group-common downlink channel transmission is a physical downlink shared channel (PDSCH) transmission.

4. The one or more non-transitory, computer-readable media of claim 3, wherein the PDSCH transmission is for a multicast-broadcast service (MBS).

5. The one or more non-transitory, computer-readable media of claim 1, wherein the first set of DAIs includes a first counter DAI and a first total DAI and the second set of DAIs includes a second counter DAI and a second total DAI.

6. A method comprising:
   generating first hybrid automatic repeat request-acknowledgment (HARQ-ACK) information for a unicast downlink channel transmission based on a first set of downlink assignment indexes (DAIs) that is based on one or more unicast transmissions;
   generating second HARQ-ACK information for a first group-common downlink channel transmission in a first common frequency resource (CFR) based on a second set of DAIs that is based on one or more multicast transmissions;
   generating third HARQ-ACK information for a second group-common downlink channel transmission in a second CFR based on a third set of DAIs that is based on one or more multicast transmissions, wherein a counter DAI of the third set of DAIs is sequentially incremented with respect to a counter DAI of the second set of DAIs; and
   constructing a dynamic HARQ-ACK codebook by concatenating the first HARQ-ACK information and the second HARQ-ACK information in sequence.

7. The method of claim 6, wherein the method further comprises:
   concatenating the first HARQ-ACK information based on the first set of DAIs and the second HARQ-ACK information based on the second set of DAIs.

8. The method of claim 6, wherein the first group-common downlink channel transmission is a physical downlink shared channel (PDSCH) transmission.

9. The method of claim 8, wherein the PDSCH transmission is for a multicast-broadcast service (MBS).

10. The method of claim 6, wherein the first set of DAIs includes a first counter DAI and a first total DAI and the second set of DAIs includes a second counter DAI and a second total DAI.

11. An apparatus comprising:
    baseband circuitry to:
       generate a unicast downlink channel transmission;
       generate a first group-common downlink channel transmission in a first common frequency resource (CFR);
       generate a second group-common downlink channel transmission in a second CFR;
       process a hybrid automatic repeat request-acknowledgment (HARQ-ACK) codebook that includes first HARQ-ACK information, second HARQ-ACK information, and third HARQ-ACK information concatenated in sequence, wherein the first HARQ-ACK information is for the unicast downlink channel transmission based on a first set of downlink assignment indexes (DAIs) that is based on one or more unicast transmissions, the second HARQ-ACK information is for the first group-common downlink channel transmission based on a second set of DAIs that is based on one or more multicast transmissions, and the third HARQ-ACK information is for the second group-common downlink channel transmission based on a third set of DAIs that is based on one or more multicast transmissions, wherein a counter DAI of the third set of DAIs is sequentially incremented with respect to a counter DAI of the second set of DAIs; and
    interface circuitry coupled with the baseband circuitry to enable communication.

12. The apparatus of claim 11, wherein the first HARQ-ACK information is concatenated in sequence with the second HARQ-ACK information based on the first set of DAIs and the second set of DAIs.

13. The apparatus of claim 11, wherein the first group-common downlink channel transmission is a physical downlink shared channel (PDSCH) transmission.

14. The apparatus of claim 13, wherein the PDSCH transmission is for a multicast-broadcast service (MBS).

15. The apparatus of claim 11, wherein the first set of DAIs includes a first counter DAI and a first total DAI and the second set of DAIs includes a second counter DAI and a second total DAI.

* * * * *